(12) United States Patent
Wyle et al.

(10) Patent No.: US 8,775,408 B2
(45) Date of Patent: Jul. 8, 2014

(54) DOCUMENT ELEMENT INDEXING SYSTEM

(75) Inventors: David A. Wyle, Corona Del Mar, CA (US); William W. Hosek, Laguna Niguel, CA (US)

(73) Assignee: SurePrep, LLC, Newport Beach, CA (US)

( * ) Notice: Subject to any disclaimer, the term of this patent is extended or adjusted under 35 U.S.C. 154(b) by 125 days.

(21) Appl. No.: 13/243,774

(22) Filed: Sep. 23, 2011

(65) Prior Publication Data

US 2013/0080440 A1    Mar. 28, 2013

(51) Int. Cl.
*G06F 7/00* (2006.01)

(52) U.S. Cl.
USPC .......................................................... 707/711

(58) Field of Classification Search
USPC .......................................................... 707/711
See application file for complete search history.

(56) References Cited

U.S. PATENT DOCUMENTS

| | | | |
|---|---|---|---|
| 3,963,910 A | 6/1976 | Enomoto et al. |
| 4,754,326 A | 6/1988 | Kram et al. |
| 5,054,096 A | 10/1991 | Beizer |
| 5,144,115 A | 9/1992 | Yoshida |
| 5,404,294 A | 4/1995 | Karnik |
| 5,737,599 A | 4/1998 | Rowe et al. |
| 5,787,295 A | 7/1998 | Nakao |
| 5,848,426 A | 12/1998 | Wang et al. |
| 5,878,215 A | 3/1999 | Kling et al. |
| 5,923,842 A | 7/1999 | Pedersen et al. |
| 5,940,811 A | 8/1999 | Norris |
| 5,963,926 A | 10/1999 | Kumomura |
| 6,003,019 A | 12/1999 | Eaton et al. |
| 6,009,442 A | 12/1999 | Chen et al. |
| 6,012,050 A | 1/2000 | Eaton et al. |
| 6,021,400 A | 2/2000 | Gallacher et al. |
| 6,128,633 A | 10/2000 | Michelman et al. |
| 6,144,380 A | 11/2000 | Shwarts et al. |
| 6,173,285 B1 | 1/2001 | Nishita et al. |
| 6,202,052 B1 | 3/2001 | Miller |
| 6,209,095 B1 | 3/2001 | Anderson et al. |
| 6,226,752 B1 | 5/2001 | Gupta et al. |
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |
| 6,338,138 B1 | 1/2002 | Raduchel et al. |
| 6,369,811 B1 | 4/2002 | Graham et al. |
| 6,473,741 B1 | 10/2002 | Baker |
| 6,476,930 B1 | 11/2002 | Roberts et al. |
| 6,480,866 B2 | 11/2002 | Mastie |
| 6,510,466 B1 | 1/2003 | Cox et al. |
| 6,539,479 B1 | 3/2003 | Wu |

(Continued)

OTHER PUBLICATIONS

Harvey, Greg. *Adobe Acrobat 5 PDF for Dummies*, 2002, Wiley Publishing, Inc., pp. 13-34.

(Continued)

*Primary Examiner* — Apu Mofiz
*Assistant Examiner* — Ajith Jacob
(74) *Attorney, Agent, or Firm* — Snell & Wilmer LLP

(57) ABSTRACT

Devices, methods and systems are disclosed herein to describe a document element indexing system which efficiently organizes different files or the constituent parts of different files into an index, thereby allowing users to easily and efficiently access, annotate and/or review the desired information. The indexing system may be applied to organize components of homogeneous and/or heterogeneous file types.

20 Claims, 27 Drawing Sheets

(56) References Cited

U.S. PATENT DOCUMENTS

| | | | |
|---|---|---|---|
| 6,567,628 B1 | 5/2003 | Guillemin et al. |
| 6,567,789 B1 | 5/2003 | Baker |
| 6,572,661 B1 | 6/2003 | Stern |
| 6,584,505 B1 | 6/2003 | Howard et al. |
| 6,598,023 B1 | 7/2003 | Drummond et al. |
| 6,601,173 B1 | 7/2003 | Mohler |
| 6,658,464 B2 | 12/2003 | Reisman |
| 6,721,783 B1 | 4/2004 | Blossman et al. |
| 6,912,508 B1 | 6/2005 | McCalden et al. |
| 6,957,384 B2 | 10/2005 | Jeffery et al. |
| 7,155,404 B1 | 12/2006 | Johnson et al. |
| 7,171,615 B2 | 1/2007 | Jensen |
| 7,234,103 B1 | 6/2007 | Regan |
| 7,257,553 B1 | 8/2007 | Baker |
| 7,565,312 B1 | 7/2009 | Shaw et al. |
| 7,584,884 B2 | 9/2009 | Fox et al. |
| 7,647,258 B2 | 1/2010 | William et al. |
| 7,660,988 B2 | 2/2010 | Carmichael et al. |
| 2001/0037268 A1 | 11/2001 | Miller |
| 2001/0044762 A1 | 11/2001 | Nault |
| 2002/0133410 A1 | 9/2002 | Hermreck et al. |
| 2002/0161698 A1 | 10/2002 | Wical |
| 2002/0161796 A1 | 10/2002 | Sylthe |
| 2002/0184125 A1 | 12/2002 | Cirulli et al. |
| 2003/0036912 A1 | 2/2003 | Sobotta et al. |
| 2003/0061131 A1 | 3/2003 | Parkan, Jr. |
| 2003/0163547 A1 | 8/2003 | Beisty et al. |
| 2003/0233296 A1 | 12/2003 | Wagner |
| 2004/0024665 A1 | 2/2004 | Foster |
| 2004/0078271 A1 | 4/2004 | Morano et al. |
| 2004/0088233 A1 | 5/2004 | Brady et al. |
| 2004/0150854 A1 | 8/2004 | Sprague et al. |
| 2004/0216057 A1 | 10/2004 | Wyle et al. |
| 2004/0225581 A1 | 11/2004 | Wyle et al. |
| 2004/0243626 A1 | 12/2004 | Wyle et al. |
| 2005/0038722 A1 | 2/2005 | Throndson et al. |
| 2005/0060234 A1 | 3/2005 | Reahard |
| 2005/0065852 A1 | 3/2005 | Bross et al. |
| 2005/0102283 A1 | 5/2005 | Anderson et al. |
| 2006/0026083 A1 | 2/2006 | Wyle |
| 2006/0026086 A1 | 2/2006 | Jim |
| 2006/0155618 A1 | 7/2006 | Wyle |
| 2006/0178961 A1 | 8/2006 | Stanley et al. |
| 2006/0180650 A1 | 8/2006 | Claessens et al. |
| 2007/0033118 A1 | 2/2007 | Hopkinson |
| 2007/0250392 A1 | 10/2007 | Paulsen et al. |
| 2007/0271249 A1* | 11/2007 | Cragun et al. ............ 707/3 |
| 2008/0077503 A1 | 3/2008 | Zias et al. |
| 2008/0082432 A1 | 4/2008 | Baker |
| 2008/0120129 A1 | 5/2008 | Seubert et al. |
| 2008/0147494 A1 | 6/2008 | Larson |
| 2008/0228714 A1* | 9/2008 | Prager et al. ............ 707/3 |
| 2008/0319882 A1 | 12/2008 | Wyle |

OTHER PUBLICATIONS

Cia, Patricia, "Managing Your Bookmarks and Favorites", SLA, 2 pages, Feb. 25, 2009.

MSPivot, Microsoft Office Excel PivotTable Reports 101, downloaded on Sep. 14, 2008 from http://office.microsoft.com/em-us/excel/HA010346321033.aspx?ac=, 12 pages.

IntelliTax for Windows and DOS, Accounting Technology, v 18, n 9, p. 38, Oct. 2002.

SurePrep introduces Tax Prep Workflow System, Anonymous, CPA technology Advisor, Ft. Atkinson, Jun./Jul. 2005, vol. 15, Iss. 3, p. 7.

Missing Links: an insider's view, Dauphinais G. Williams, PC Magazine, V6, n15, p. 168(2), Sep. 15, 1987.

Ted Needleman, Accounting Today, New York, Aug. 1998, vol. 12, Iss. 14, p. 24, 6 pgs.

* cited by examiner

| | |
|---|---|
| User Interface | • Display document elements and components<br>• Browse Documents to add to Binder<br>• Display Notes<br>• Link elements to index section<br>• Define cross-references<br>• Manage sign-offs<br>• Manage binders |
| Server Interface | • Accept inbound instructions from User Interface<br>• Enforce business rules<br>• Create index<br>• Create binder based on index<br>• Add section to index<br>• Add section to section<br>• Link document-element to index section<br>• Add document-element components: cross-references, notes, sign-offs |
| Database Interface | • Binder definition information<br>• Index information for binders<br>• Index-document relationships<br>• Document-Element components: cross-reference, notes, sign-offs |

User interfaces will exist in a variety of platforms

FIG. 2

SAMPLE TITLE

John Doe

This is a sample first paragraph. The sample first paragraph may contain five sentences. This is the third sentence. This is the fourth sentence. This is the fifth sentence. 550

This is a sample second paragraph. The sample second paragraph may contain only 2 sentences. 551

This is a sample third paragraph. The sample third paragraph may contain 3 sentences. Following the third sentence may be a sample image having an enclosed border.

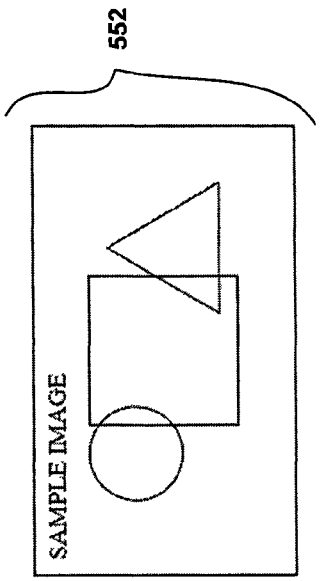

552

This is a sample fourth paragraph. The sample fourth paragraph may contain 2 sentences.

DOCUMENT ELEMENT INDEXING SYSTEM

BACKGROUND

1. Field

The present disclosure relates to an electronic binder having an indexing system for different elements (e.g., portions, components, and the like) of the same or different file types (e.g., text files, spreadsheet files, and the like) to allow indexing at a more granular level than the file level. In this manner, multiple elements from a single file or electronic document may be indexed independently. For the sake of clarity and ease of understanding, references will be made to tax documents and the field of tax preparation or the accounting industry. However, one of ordinary skill in the art will understand that the concepts described herein are applicable to any number of different fields, including, but not limited to indexing any number of business documents, personal documents, or any combination thereof.

2. Description of the Related Art

Currently, Adobe® Acrobat® offers the capability to merge a group of source documents, and to organize documents via bookmarking. More particularly, Acrobat® documents are saved in PDF format and allow the user to merge one PDF file with another PDF file. The user may also create bookmark categories and bookmark names, move bookmarks and even pages to organize the pages of the document to be in the same order as the bookmarks for the PDF file. However, these features of Adobe® Acrobat® are very cumbersome and time consuming to use as they require multiple steps to be executed properly. Furthermore, Adobe® Acrobat® is restrictive in that the user is required to convert all files (e.g., text files, spreadsheet files, and the like) to a PDF file prior to merging, and once converted, the documents can no longer be maintained or edited in their native application. Accordingly, users are not provided the ability to organize files easily and efficiently, which are crucial to the profitability of many businesses. Accordingly, what is needed is a document element indexing system that may provide organizational advantages superior to what is currently offered in the industry.

SUMMARY

Devices, methods and systems are disclosed herein to describe a binder having a document element indexing system which efficiently organizes one or more files or the constituent parts of one or more files into an index, thereby allowing users to easily and efficiently access and organize the desired information within the binder. The indexing system may be applied to organize components of homogeneous and/or heterogeneous file types.

In one embodiment, provided is an indexing system for an electronic binder configured to organize elements or components of heterogeneous documents, the indexing system comprising: an end user device configured to receive user instruction to link a first document element to a first section of an index and generate a first signal for linking the first document element to the first section, and further configured to receive user instruction to link a second document element to a second section of an index and generate a second signal for linking the second document element to the second section; a server coupled to the end user device, the server configured to receive the first signal and the second signal, the server further configured to create a first pointer corresponding to the source location of the first document element and link the first pointer to the first section of the index and generate a third signal for recording the first pointer and information related to linking the first pointer to the first section of the index, the server further configured to create a second pointer corresponding to the source location of the second document element and link the second pointer to the second section of the index the first document element and generate a fourth signal for recording the second pointer and information related to linking the second pointer to the second section of the index; and a database store coupled to the server, the database store configured to receive the third signal and record the first pointer and information related to linking the first pointer to the first section of the index, the database store further configured to receive the fourth signal and record the second pointer and information related to linking the second pointer to the second section of the index.

In one embodiment, provided is an indexing system for an electronic binder configured to organize elements or components of heterogeneous documents, the indexing system comprising a first processor and a corresponding first non-transitory memory device, and a second processor and a corresponding second non-transitory memory device. More particularly, the first non-transitory memory device is coupled to the first processor, and configured to store instructions that when executed by the first processor, causes the first processor to perform: receiving user instruction to link a first document element to a first section of an index, generating a first signal for linking the first document element to the first section, receiving user instruction to link a second document element to a second section of an index, and generating a second signal for linking the second document element to the second section. Furthermore, the second non-transitory memory device is coupled to the second processor, and configured to store instructions that when executed by the second processor, causes the second processor to perform: receiving the first instruction and the second instruction, creating a first pointer corresponding to the source location of the first document element, linking the first pointer to the first section of the index, generating a third signal for recording the first pointer and information related to linking the first pointer to the first section of the index, creating a second pointer corresponding to the source location of the second document element, linking the second pointer to the second section of the index the first document element, and generating a fourth signal for recording the second pointer and information related to linking the second pointer to the second section of the index.

In one embodiment, provided is a method of indexing an electronic binder configured to organize elements or components of heterogeneous documents, the method comprising: receiving, at the end user device, a user instruction to link a first document element to a first section of an index; generating, at the end user device, a first signal for linking the first document element to the first section; receiving, at the end user device, user instruction to link a second document element to a second section of an index; generating, at the end user device, a second signal for linking the second document element to the second section; sending, from the end user device, the first signal and the second signal; receiving, at a server, the first signal and the second signal; creating, at the server, a first pointer corresponding to the source location of the first document element; linking, at the server, the first pointer to the first section of the index; generating, at the server, a third signal for recording the first pointer and information related to linking the first pointer to the first section of the index; creating, at the server, a second pointer corresponding to the source location of the second document element; linking, at the server, the second pointer to the second section of the index the first document element; generating, at the server, a fourth signal for recording the second pointer and information related to linking the second pointer to the second section of the index and, sending the third signal and fourth signal.

BRIEF DESCRIPTION OF THE DRAWINGS

The features, obstacles, and advantages of the present invention will become more apparent from the detailed description set forth below when taken in conjunction with the drawings, wherein:

FIG. 2 depicts a chart of actions performed by the respective components of the indexing system according to one or more embodiments described herein.

FIG. 5A depicts a sample document having document elements according to one or more embodiments described herein.

FIG. 6 depicts a sample index system having document elements according to one or more embodiments described herein.

FIG. 7 depicts a snapshot of an interface providing the user an opportunity to add an index section according to one or more embodiments described herein.

FIG. 12B depicts a snapshot of an interface illustrating the display of cross references according to one or more embodiments described herein.

DETAILED DESCRIPTION

Figure 1:
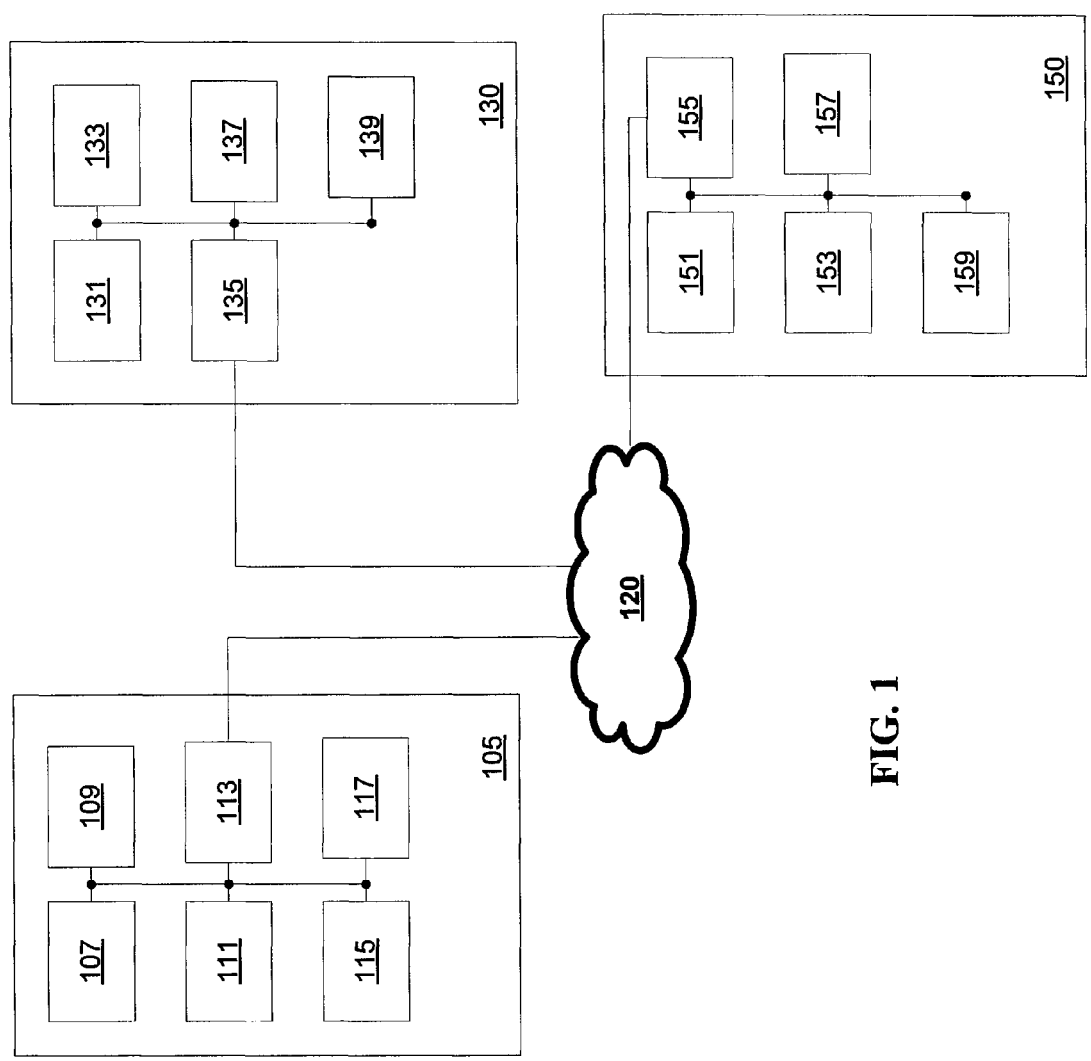
FIG. 1 depicts an indexing system according to one or more embodiments described herein.

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements. Turning to FIG. 1, the interrelationships of an indexing system 100 are illustrated. The indexing system 100 may comprise an end user device 105 communicating with a server 130 and a database store 150. The end user device 105 may be located remotely from the server 130 and the database store 150 and may communicate with the server 130 and the database store 150 via a network 120 (e.g., the Internet). The system 100 is described to include an end user device 105, a server 130 and a database store 150 distinctly located from each other. However, other embodiments where the end user device 105, the server 130 and/or the database store 150 are integrated into one physical device is possible. Alternatively, the server 130 and the database store 150 may be integrated, while the end user device 105 is remote. Alternatively, the server 130 and the database store 150 may communicate with each other via the network 120 as well. An ordinary artisan will understand that that the indexing system 100 illustrated in FIG. 1 is only one example, that many other configurations are possible and further, duplicative components may be eliminated where possible.

The end user device 105 may be a personal computer, mobile computing device, and the like and may include a processor 107, a memory 109, a network interface 111, an input/output (I/O) interface 113, a binder application module 115 and a document editor 117.

The server 130 may be a computing device, and may include a processor 131, a memory 133, a network interface 135, a process model module 137 and a service interface module 139.

The database store 150 may also be a computing device, and may include a processor 151, a memory 153, a network interface 155, a database model module 157 and a data store 159.

The structure of the components of the indexing system 100 having been described, attention will now be turned to functionality of the various components. It is understood that the indexing system 100 is merely one embodiment of how the features of the present invention may be implemented. However, any of a number of configurations are possible. For example, the features of the server 130 and the database store 150 may be performed at the user device 105 (e.g., a personal computing device may be configured to achieve the functionality of the end user device 105, the server 130 and the database store 150 described herein). Alternatively, the server 130 and the database store 150 may be integrated at a single location while communicating with the user device 105 over a network (e.g., the Internet). Those of ordinary skill in the art will recognize that a plurality of different implementations of the present invention are possible and are all within the spirit and scope of this disclosure. However, for the sake of clarity, the following description will refer to the indexing system 100 of FIG. 1.

FIG. 2 illustrates a chart of the various features which may be performed by each of the end user device 105, the server 130 and the database store 150 as they work together to generate and manage document elements and document element components. Document elements may be, for example, a portion of a document file (e.g., a .doc, a .txt, and the like), certain rows, columns and/or sheets, or portions thereof from a spreadsheet file (e.g., an .xls file and the like), certain slide(s) or a portion of a slide from a presentation file (e.g., a .ppt file and the like) and so forth. Document element components may include cross-references, notes, sign-offs and the like.

The end user device 105 may be generally utilized to display document elements and/or document element components, browse documents elements for adding to the binder, display notes, link document elements to index sections, manage document element components (e.g., define cross-references, manage sign-offs and manage binders), among other features. More particularly, the processor 107 may execute an instruction stored in the memory 109 to send to the I/O interface 113 images and/or text related to the display of document elements and/or components for displaying on a display (not shown) connected to the I/O interface 113. The binder application module 115 may receive user selections of certain document elements and/or document element components from the I/O interface 113 for adding into the index. The binder application module 115 may also be utilized by the user to link the document elements to the specific index sections. In addition, the binder application module 115 may link document element components to document elements (e.g., stamps, signoffs, notes) or to other document element components (e.g., from a first side of a cross-reference to a second side of a cross-reference). In one embodiment, any particular document element may be linked to one or more specific index section. For example, a document element specifying annual income may be linked to a first specific index section labeled "income" and a second specific index section labeled "annual data". The binder application module 115 may also be used to define cross references, manage sign-offs and other document element components. The document editor 117 may receive user instructions to delete/add/edit certain portions of certain document elements and/or document element components from the I/O interface 113 prior to or after the document elements and/or document element components are added into the index. In one embodiment, a different document editor may be included to manage a specific type of document type. Alternatively, or in addition, one document editor may be utilized to edit multiple document types. In another embodiment, the document editor module 117 may be a sub-component of the binder application module 115. In yet another embodiment, the document editor module 117 may be a separate component working in conjunction with the binder application module 115 to fulfill the user's requests. In this manner, the user end device 105 interfaces with the user to obtain instructions and requests and also to display the results to the user.

The server 130 generally accepts and processes instructions and/or requests from the end user device 105. The server 130 may also enforce business rules and may be tasked with controlling the index and making any requested change thereof. For example, the server 130 may create the index, create the binder based on the index, and/or make changes to the index (e.g., adding a section to the index, adding a subsection to a section, linking a document element to an index, linking a document element to the section and/or adding document element components such as cross-references, notes, and sign-offs to the index).

More particularly, in response to receiving an instruction related to the binder and/or index from the end user device 105 via the Network 120, the server 130 may execute the instruction and thereby manipulate and/or change the index according to the instruction. For example, the service interface module 139 may receive the instruction and determine the appropriate action. The service interface module 139 may then instruct the process model module 137 to carry out the action. For example, if the user desires to create an index, the service interface module 139 may receive an instruction to create the index and determine that a new index is to be created. The service interface module 139 may then instruct the process model module 137 to execute the process of creating the new index according to the user's instructions.

The database store 150 may store binder definition information, index information for the binders, index-document element relationships and document element component related information. In addition, the database store 150 may store authentication, template definitions and/or business rules. FIG. 2B is an example of a database schema that may be employed in one embodiment. However, one skilled in the art will understand that any of a plurality of database schema may be used to perform the methods described herein.

Figure 3A:
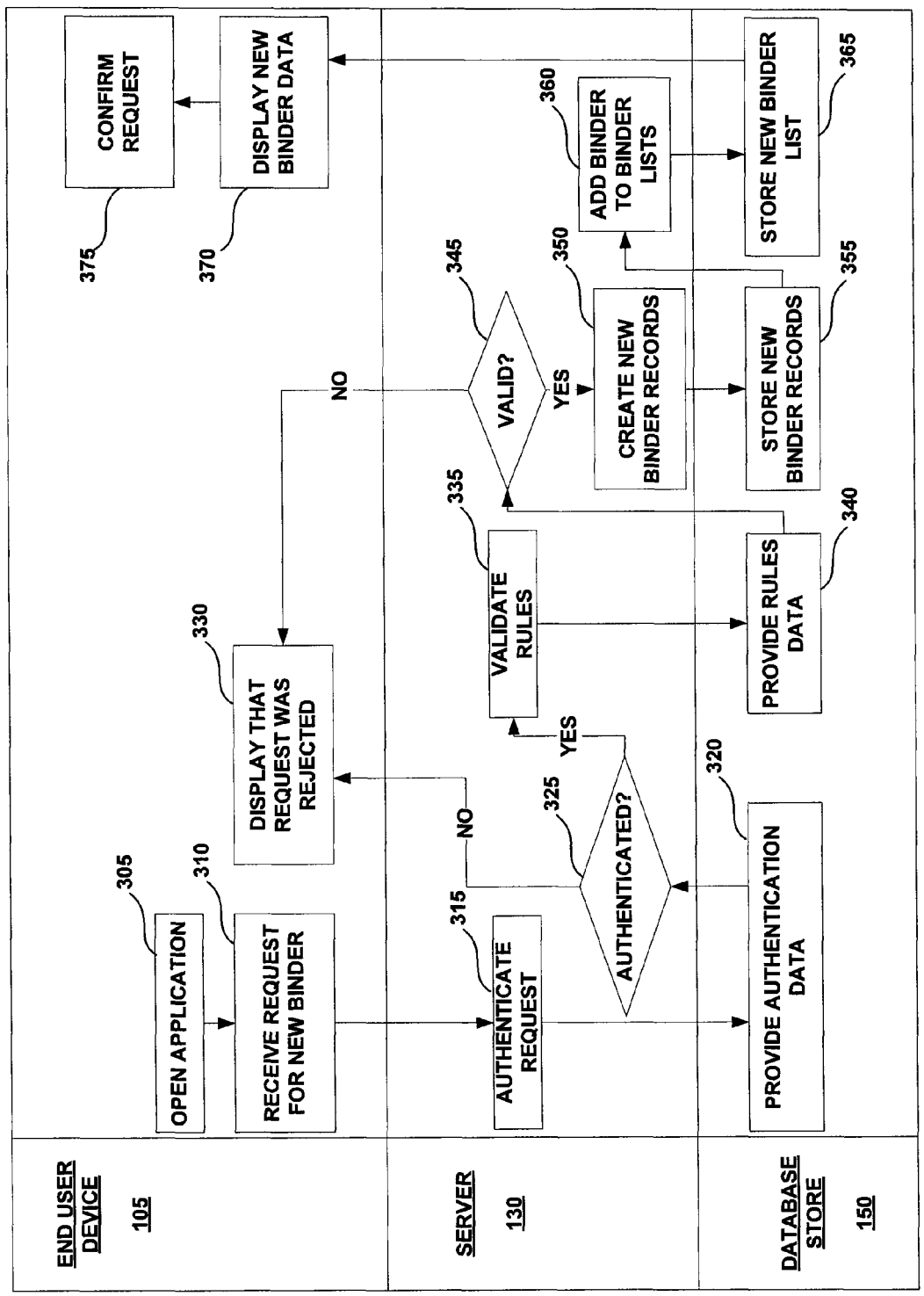
FIG. 3A illustrates a flow chart of one method of creating a binder according to one or more embodiments described herein.

FIG. 3A illustrates a flow chart 300 which diagrams how the end user device 105, the server 130 and the database store 150 operate to create a new binder. As shown, the application may be opened at the end user device 105 at step 305. At step 310, the end user device 105 may receive an instruction or request from the user to create a new binder and may send the request to create the new binder, including authentication information, to the server 130 to enable the server 130 to authenticate the request. At step 315, the server 130 may begin the authentication process. In one embodiment, the server 130 may communicate with the database store 150, at step 320, to receive data relevant to authenticate the request to create the new binder. Any of a plurality of known methods to authenticate the request and/or the end user device 105 may be employed. At step 325, the server 130 attempts to authenticate the request. If authentication is not proper, at step 330, the request is rejected by the server 130 and accordingly displayed to the user by the end user device 105. However, if the request is properly authenticated, then at step 335, the server 130 begins validating the business rules. In one embodiment, at step 340, the server 130 may again communicate with the database store 150 to receive data relevant to validating the business rules. Any of a plurality of known methods to validating the business rules may be employed. At step 345, the server 130 attempts to validate the business rules. If the business rules are not successfully validated, the request is rejected by the server 130 and accordingly displayed to the user by the end user device 105. However, if at step 345, the business rules are deemed valid, new binder records are created by the server 130 at step 350, and a copy of the binder records may be sent to the database store 150 for storage at step 355.

At step 360, the server 130 may add the newly created binder records to a binder list. Next, at step 365, the server 130 may send a copy of the updated binder list to the database store 150 for storage. At step 370, the server 130 may send the new binder record and/or the updated binder list to the end user device 105 for display to the user. At step 375, the end user device 105 may confirm the completion of the request to create a new binder with the user.

Figure 3B:
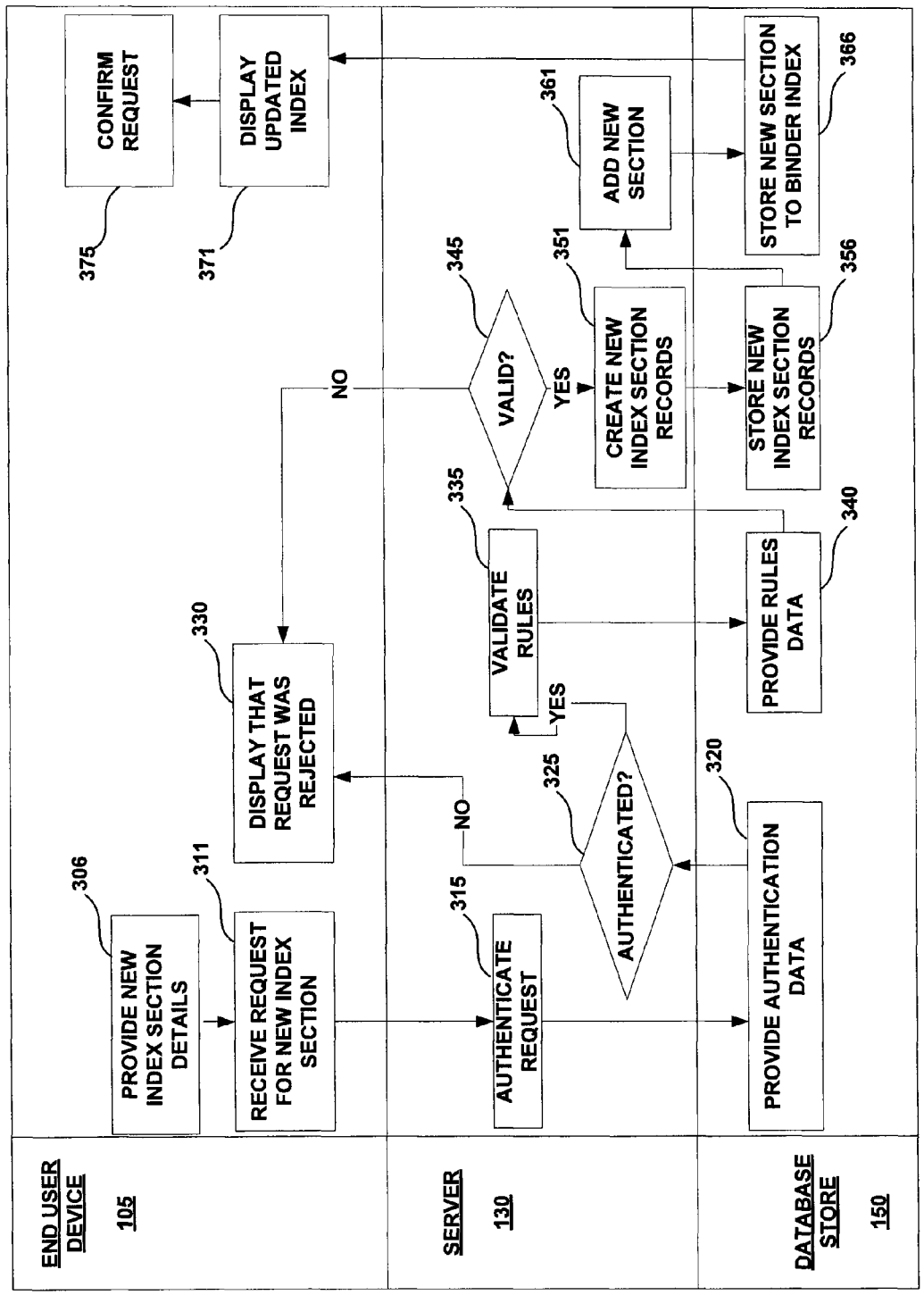
FIG. 3B illustrates a flow chart of one method of creating an index according to one or more embodiments described herein.
Figure 7:
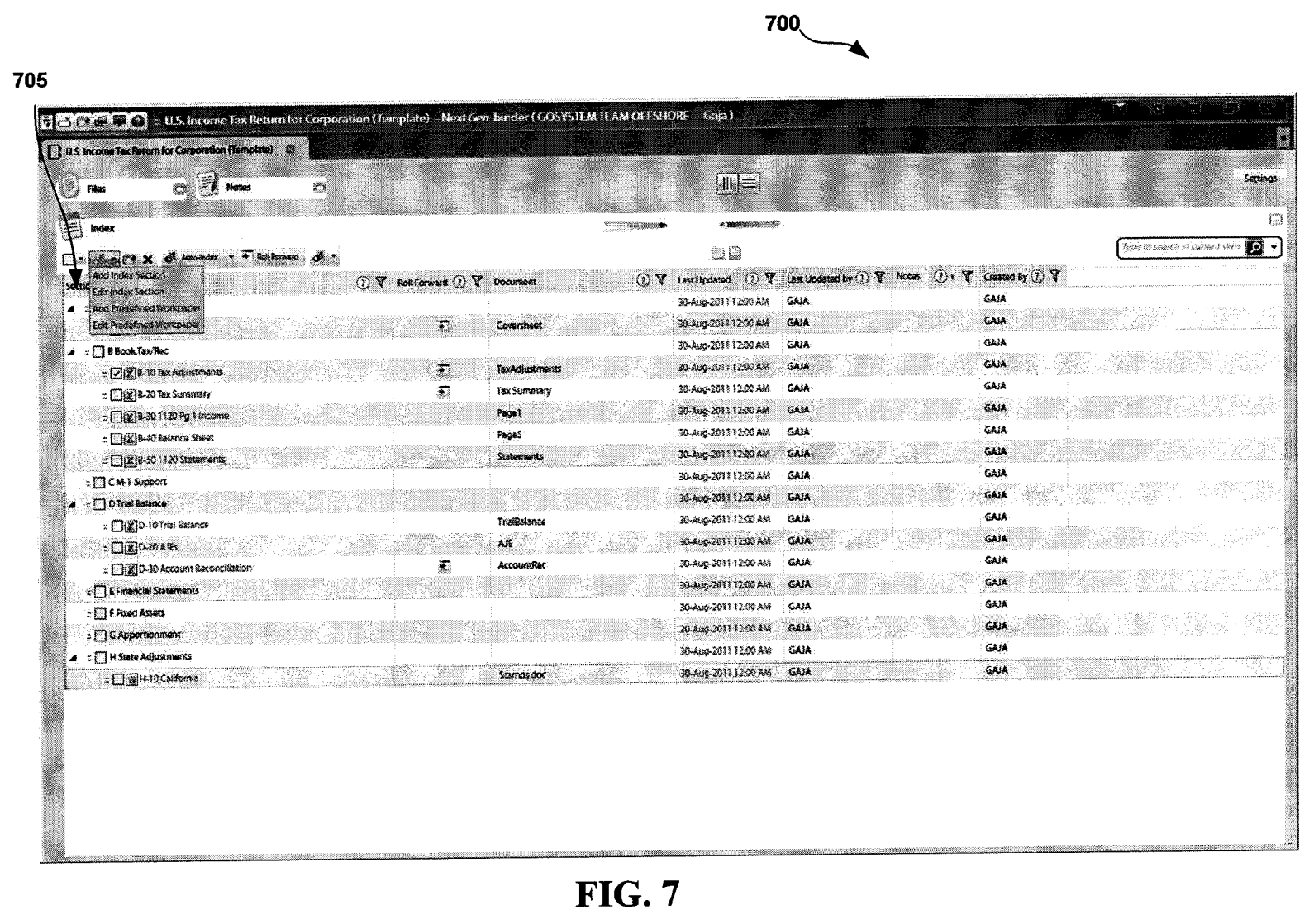

FIG. 3B illustrates one method for creating a new index section, subsection or further breakdowns of the subsection. As shown, at step 306, the user may provide new index section details (e.g., by filling out fields of a pop-up window or by following a step-by-step wizard). At step 311, the request is submitted to the server 130. For the sake of brevity, steps 315, 320, 325, 330, 335, 340 and 345 are substantially similar to those discussed above with respect to FIG. 3A and will not be described again. At step 351, after the request is authenticated and validated against defined business rules, the new index section records are created. At step 356, the new index section records are stored at the database store 150. At step 361, the new section is added to the binder. At step 366, the new section is written to the binder index and stored at the database store 150. At step 371, the display is updated at the end user device 105 to show the index with the newly created section. At step 375, the request may be optionally confirmed. FIG. 7 illustrates a screenshot 700 of one embodiment of an interface that may be used to add or edit an index section and/or add or edit a predefined work paper. As shown, screenshot 700 may include a drop down menu 705 selectable by the user to trigger the index section adding process, for example, leading to step 306 of FIG. 3B.

Figure 8:
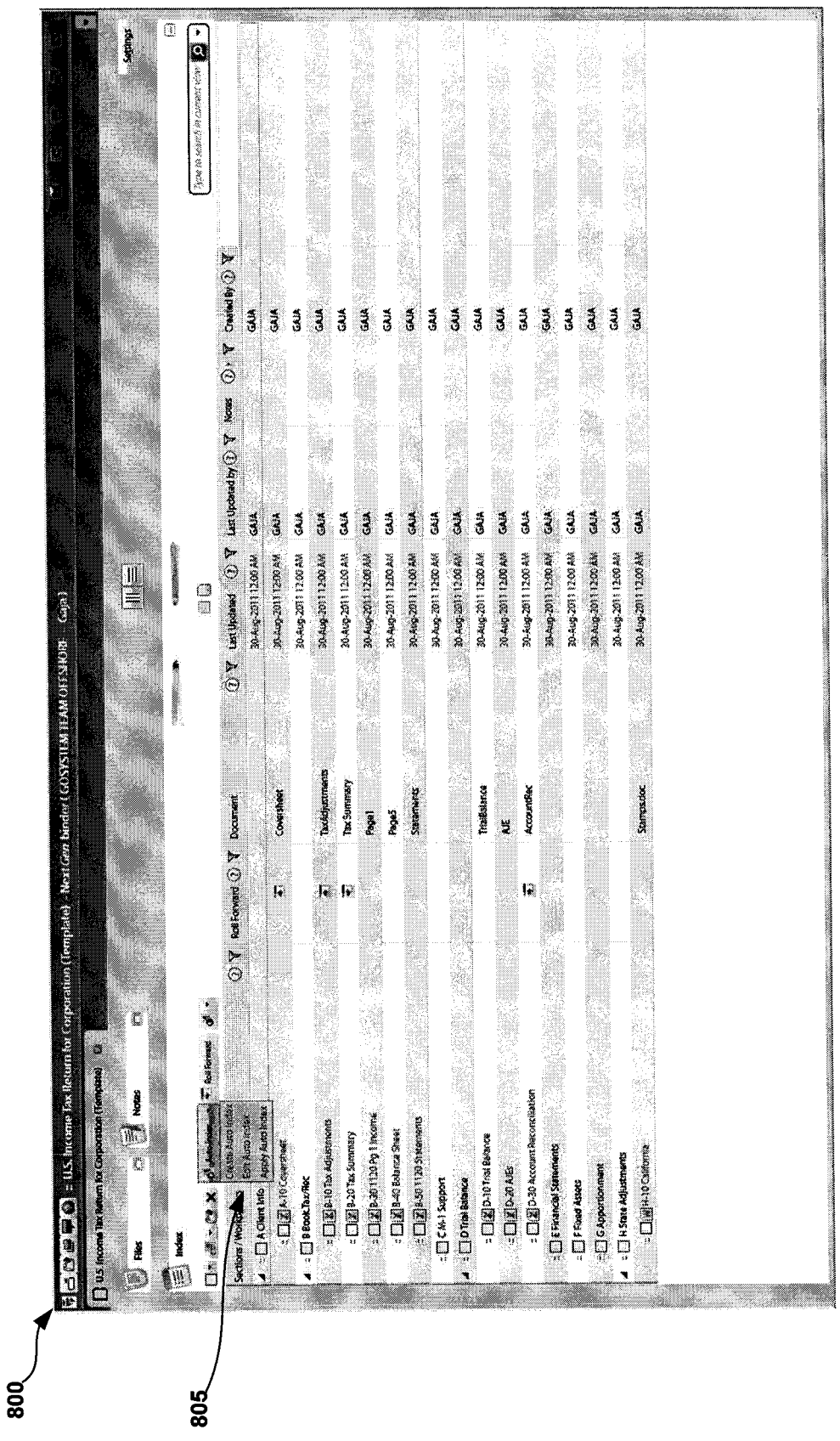
FIG. 8 depicts a snapshot of an interface providing the user an opportunity to create, edit and/or apply an auto index according to one or more embodiments described herein.

Once the index sections are added, the user may request that the server 130 to re-organize the index (e.g., perform "auto indexing"). For example, auto indexing may index document elements that have not yet been indexed based on the name of the document element. Consider a spreadsheet file having three sheets where the names of the sheets are: Sheet A (document element A), Sheet B (document element B) and Sheet C (document element C). The auto indexing feature allows the user to create a definition that indicates that Sheet A (document element A) should be placed in a first section in the index, Sheet B (document element B) should be placed in a second section of the index and Sheet C (document element C) should be placed in a third section of the index. The user may save the created definition (e.g., as Definition A). Subsequently, when the user adds to a new binder a spreadsheet file that includes sheets titled Sheet A, Sheet B and Sheet C, the user may select that the created definition (e.g., Definition A) be applied against this newly added spreadsheet file to result in Sheet A (document element A), Sheet B (document element B) and Sheet C (document element C) being indexed in the first section of the index, the second section of the index and the third section of the index, respectively. FIG. 8 is a screenshot of an interface 800 having a drop down menu 805 allowing the user to create an auto index, edit the auto index and/or apply the auto index. In this manner, the current index may be created or modified.

Figure 3C:
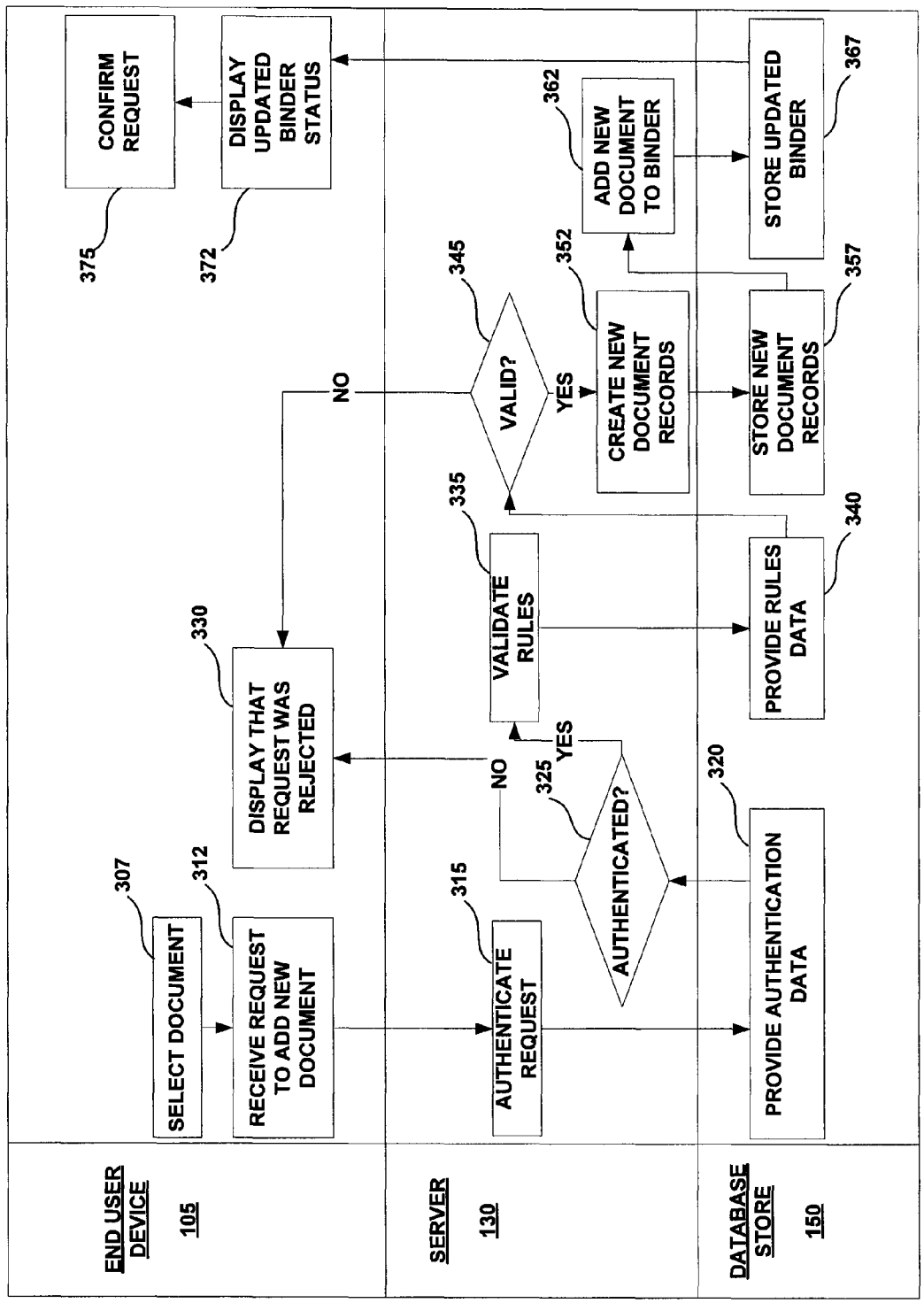
FIG. 3C illustrates a flow chart of one method of adding a document or file to a binder according to one or more embodiments described herein.
Figure 9:
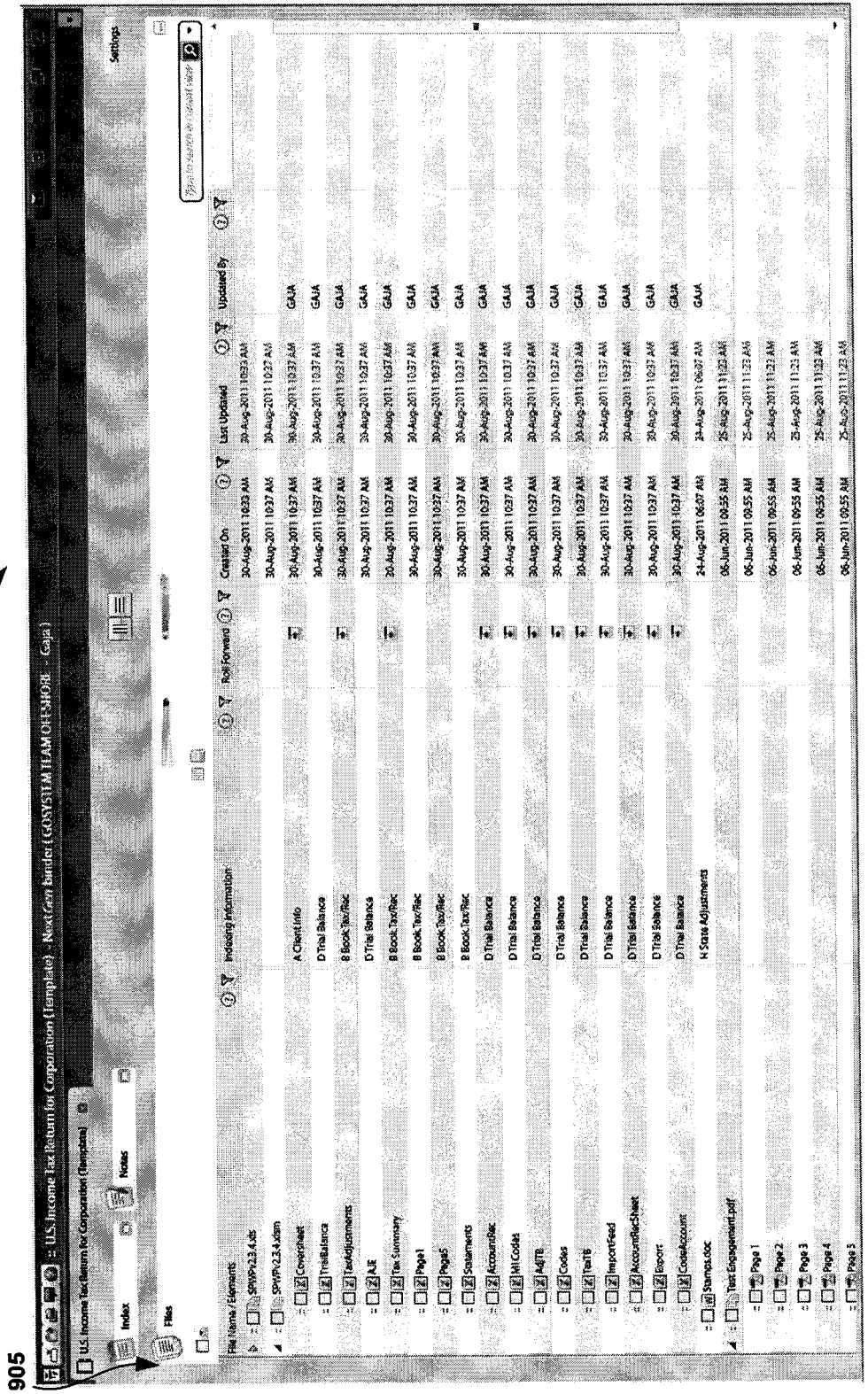
FIG. 9 depicts a snapshot of an interface providing the user an opportunity to view files and/or documents included in the index according to one or more embodiments described herein.

FIG. 3C illustrates one method for adding a new document or file to the binder. As shown, at step 307, the user may select a new document or file to be added (e.g., by dragging and dropping a file icon, by providing the file path where the document or file is stored, and the like). At step 312, the request is received by the end user device 105 and submitted to the server 130. For the sake of brevity, steps 315, 320, 325, 330, 335, 340 and 345 are substantially similar to those discussed above with respect to FIG. 3A and will not be described again. At step 352, after the request is authenticated and validated against defined business rules, the server 130 adds new document records corresponding to the document or file to be added to the binder. At step 357, the new document records are stored at the database store 150. At step 362, the new document or file is added to the binder. At step 367, the updated binder is stored at the database store 150. At step 372, the display is updated at the end user device 105 to show the newly added document. At step 375, the request may be optionally confirmed. FIG. 9 is a screenshot of an interface 900 which allows the user to view all the files that have been added to the binder. Via this interface 900, the user may select the different files for viewing, associating, disassociating, and other functionality described herein.

Figure 3D:
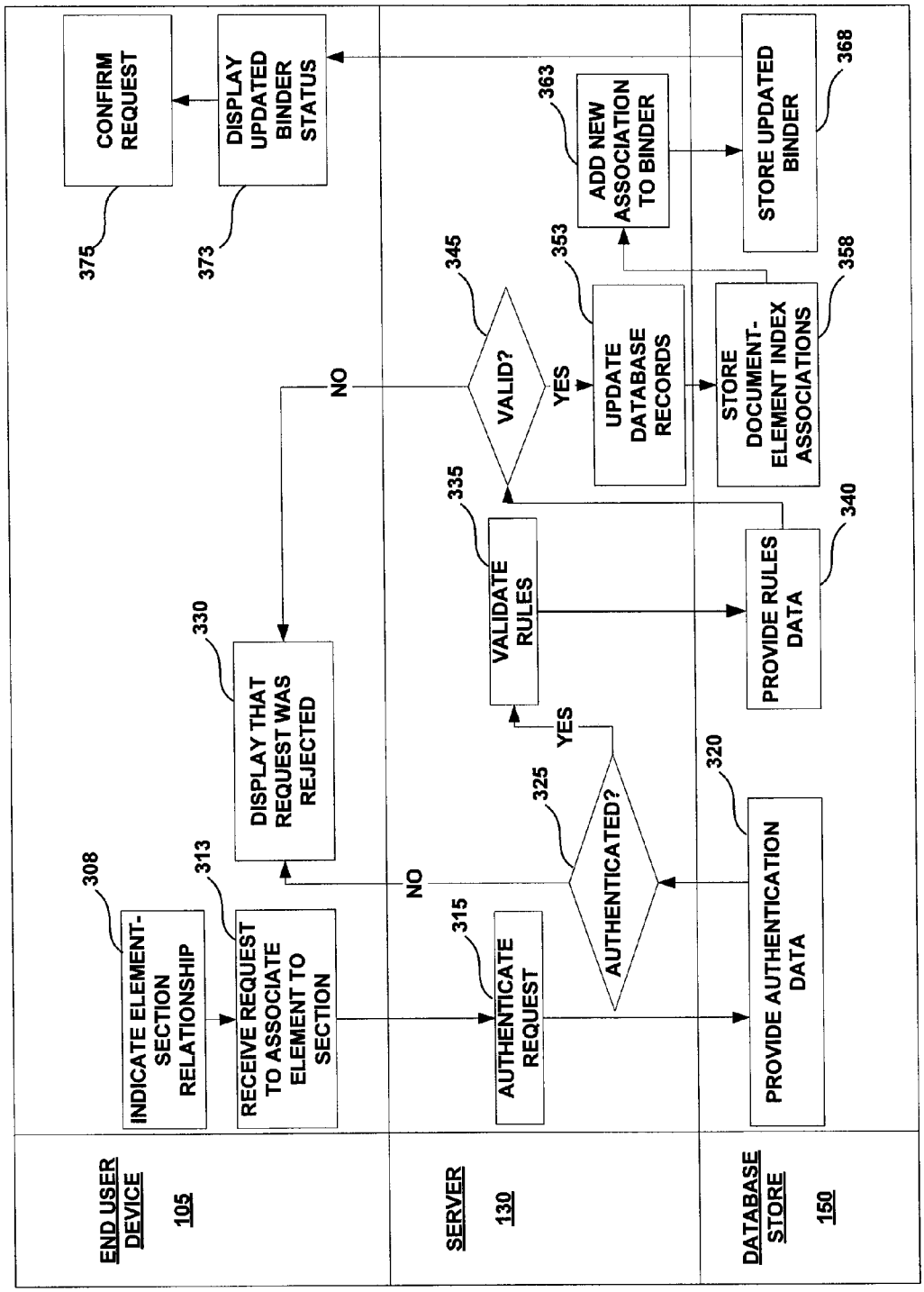
FIG. 3D illustrates a flow chart of one method of associating an document element to an index section according to one or more embodiments described herein.

FIG. 3D illustrates one method for associating a document element to an index section. As shown, at step 308, the user may select a new document element to be indexed (e.g., by dragging and dropping a file icon into the appropriate area, by providing the file path where the document is stored, and the like). At step 313, the request is received by the end user device 105 and submitted to the server 130. For the sake of brevity, steps 315, 320, 325, 330, 335, 340 and 345 are substantially similar to those discussed above with respect to FIG. 3A and will not be described again. At step 353, after the request is authenticated and validated against defined business rules, the server 130 updates the database records to include the newly formed association between the document element and the index section. At step 358, the new document element-index section associations are stored at the database store 150. At step 363, the new association is added to the binder. At step 368, the updated binder is stored at the database store 150. At step 373, the display is updated at the end user device 105 to show the newly added association. At step 375, the request may be optionally confirmed.

Figure 4A:
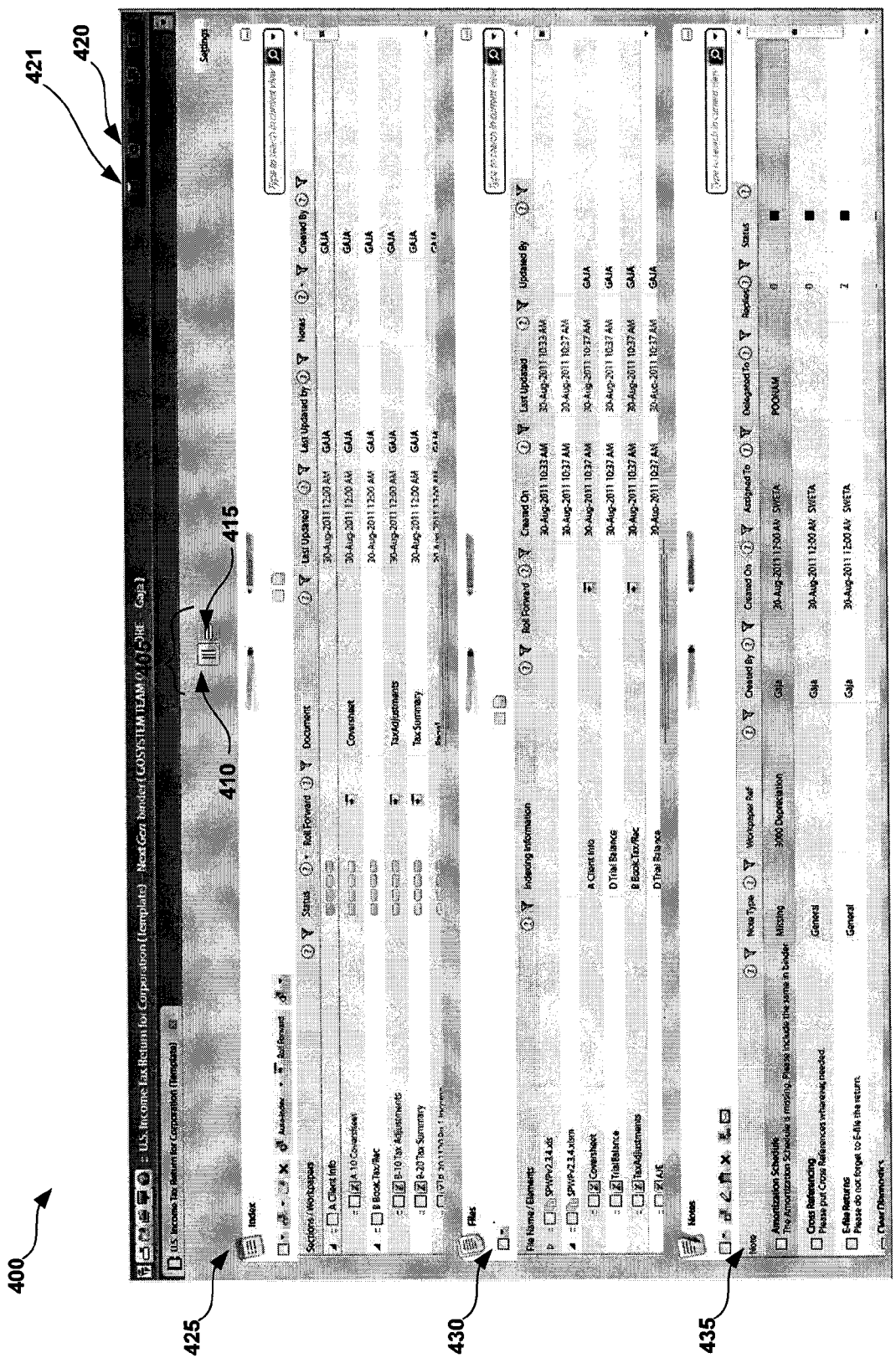
FIG. 4A depicts a snapshot of an interface in a horizontal view according to one or more embodiments described herein.
Figure 4B:
FIG. 4B depicts a snapshot of an interface in a vertical view according to one or more embodiments described herein.
Figure 4C:
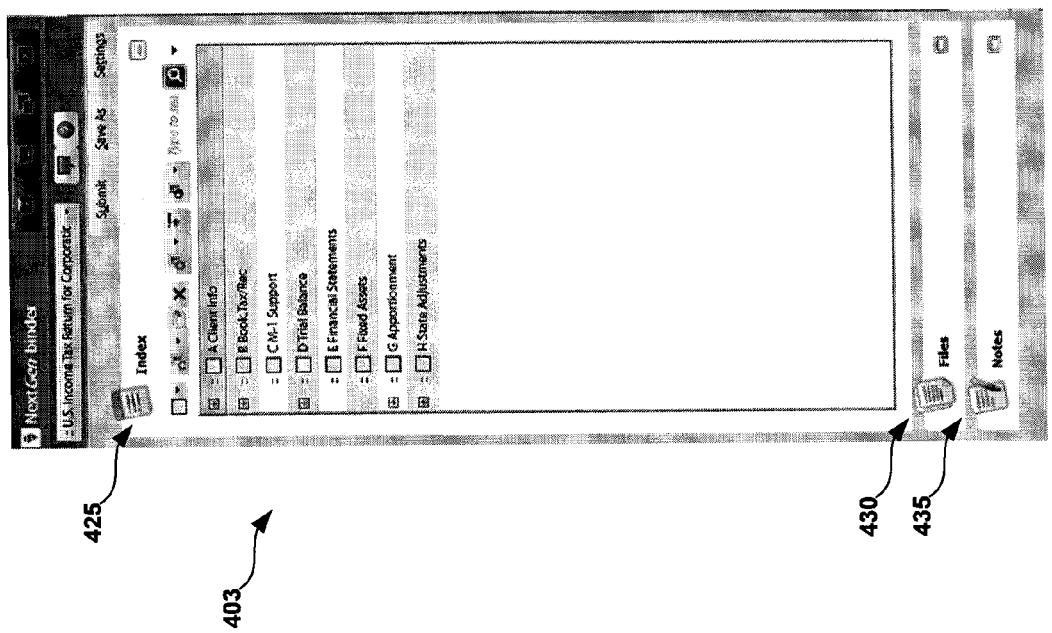
FIG. 4C depicts a snapshot of an interface in a side bar view according to one or more embodiments described herein.
Figure 4D:
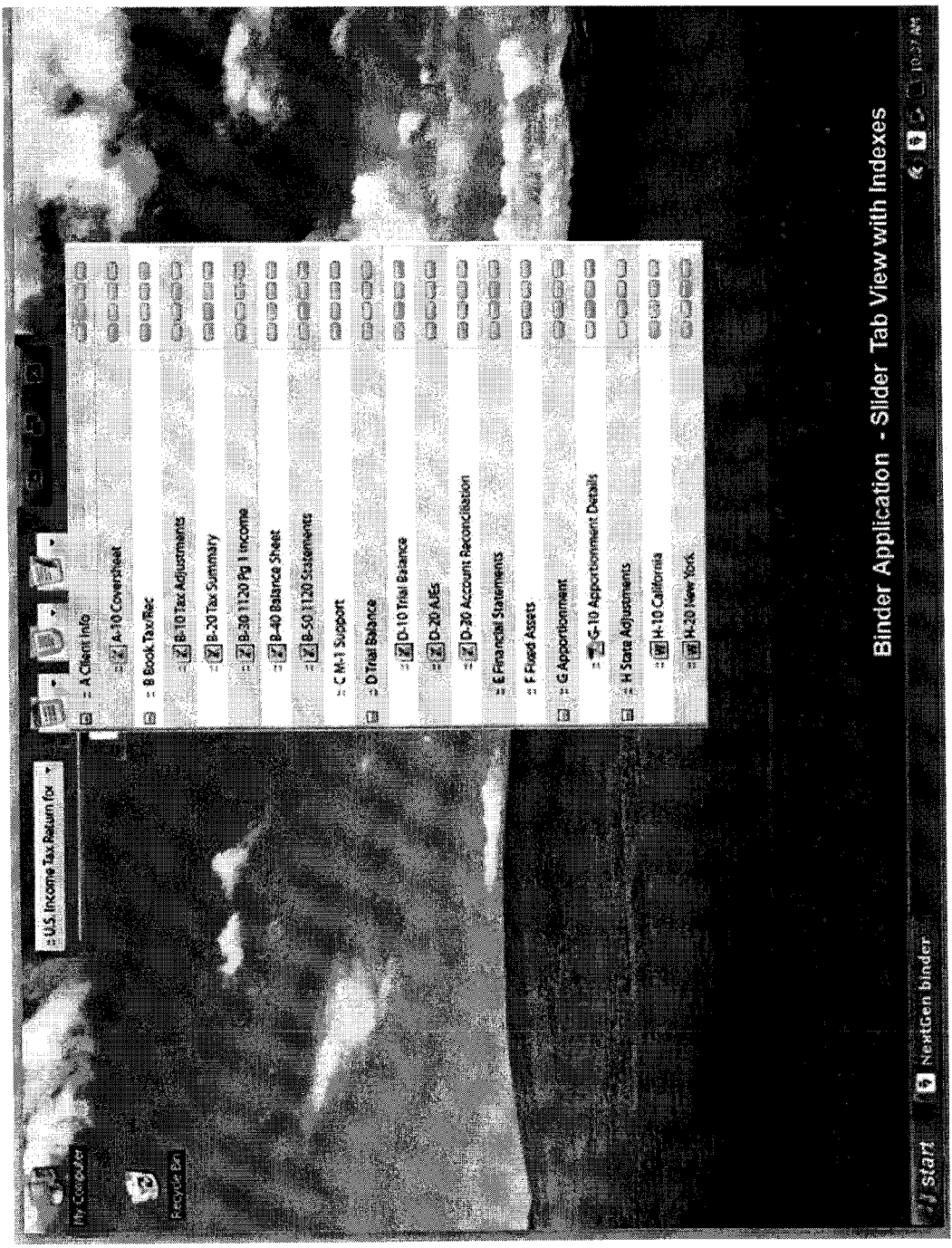
FIG. 4D depicts a snapshot of an interface in a drop down bar view according to one or more embodiments described herein.

Skipping ahead, FIGS. 4A-4D illustrate additional embodiments of the present invention. For example, FIG. 4A illustrates a snapshot of a horizontal view 400 of a binder. The horizontal view 400 may include a tool bar at the top of the screen having a side bar view button 420 for changing the view to the side bar view and a drop down view button 421. FIG. 4C illustrates a resulting side bar view 402 of the binder. FIG. 4D illustrates a drop down view of the binder. The horizontal view 400 may also include a vertical-horizontal view toggle buttons 405 having a vertical button 410 and a horizontal button 415. FIG. 4B illustrates a snapshot of a vertical view 401 of the binder. Regardless of the view (vertical, horizontal, side bar, etc.), the index section 425, the files section 430 and the notes section 435 may be displayed to user. The user may scroll through these sections intuitively to access the different functionalities of the indexed binder.

Figure 5:
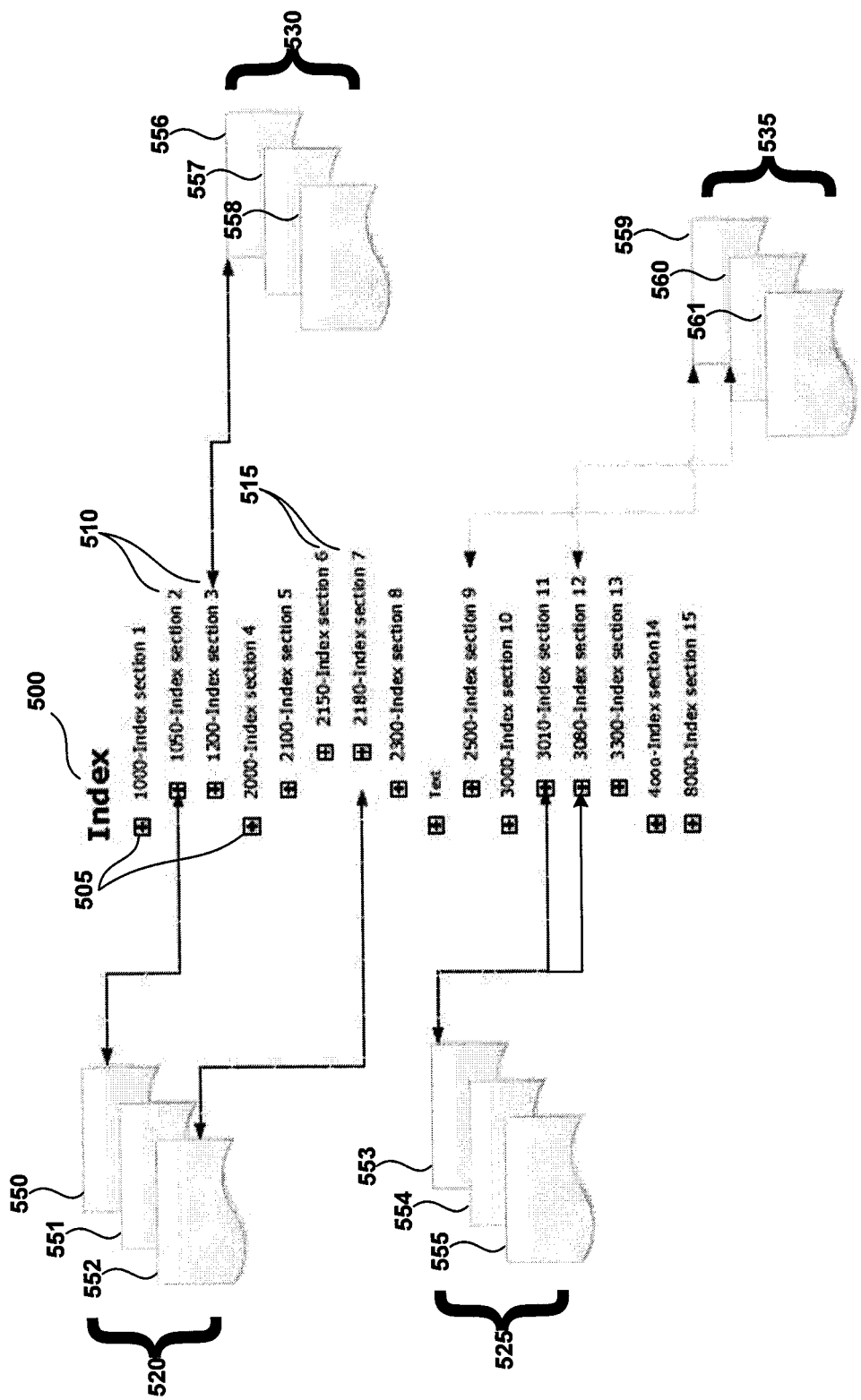
FIG. 5 depicts an example of an index created by an indexing system according to one or more embodiments described herein.

FIG. 5 illustrates an example of a created index 500 within a binder having various index sections, and how the document elements may be associated with a particular index section. For example, the index 500 may include index sections 505, index subsections 510 and further breakdowns of each subsection 515. Endless tiers of further breakdowns may be possible, but are not shown here for the sake of clarity. Each index section 505, sub-section 510 and further breakdowns of a subsection 515, may be associated with one or more document elements 550 through 561. Notably, the document elements 550 through 561 may be a portion or component of documents 520, 525, 530 and 535. That is, document elements 550, 551, 552 may be portions of document 520, document elements 553, 554, 555 may be portions of document 525, document elements 556, 557, 558 may be portions of document 530 and document element 559, 560, 561 may be portions of document 535. Indexing one document element to a plurality of indexes is possible too. For example. Document element 553 is indexed to both "3010-Index section 11" and "3080-Index section 12". Similarly, one index may include many document elements. For example, "3080-Index section 12" may include both document elements 553 and document element 560. Each of the documents 520, 525, 530 and 535 may be the same (e.g., homogeneous) type or may be different (e.g., heterogeneous) types (e.g., document 520 may be a text file having a plurality of sentences, paragraphs and/or pages, while document 525 may be a spreadsheet file having a plurality of cells and/or worksheets, while document 530 may be a presentation file having a plurality of slides, while document 535 may be an image file having a plurality of sections).

FIG. 5A illustrates an example of what document 520 may look like. The document 520 may include a document element 550 defined as the first paragraph having five sentences, a document element 551 defined as the second sentence in the third paragraph, and a document element 552 defines as the image. The document elements 550 and 552, in this example, are linked to "1050-Index section 2" and "2180-Index section 7" respectively, as shown in FIG. 5. The document element 551, however, is not linked to the index 500. While not shown here, the document elements may overlap and may be any defined portion of the document. Moreover, the document elements 550, 551 and 552, when combined, do not need to constitute the entire document. In other words, each of the document elements 550, 551 and 552 may be user-defined to be any portion of the document independent of the other document elements. Conceptually, the same idea may be applied to other types of files besides the text file. Accordingly, in this manner, one file may be broken up or organized into different document elements of varying granular levels.

Figure 5B:
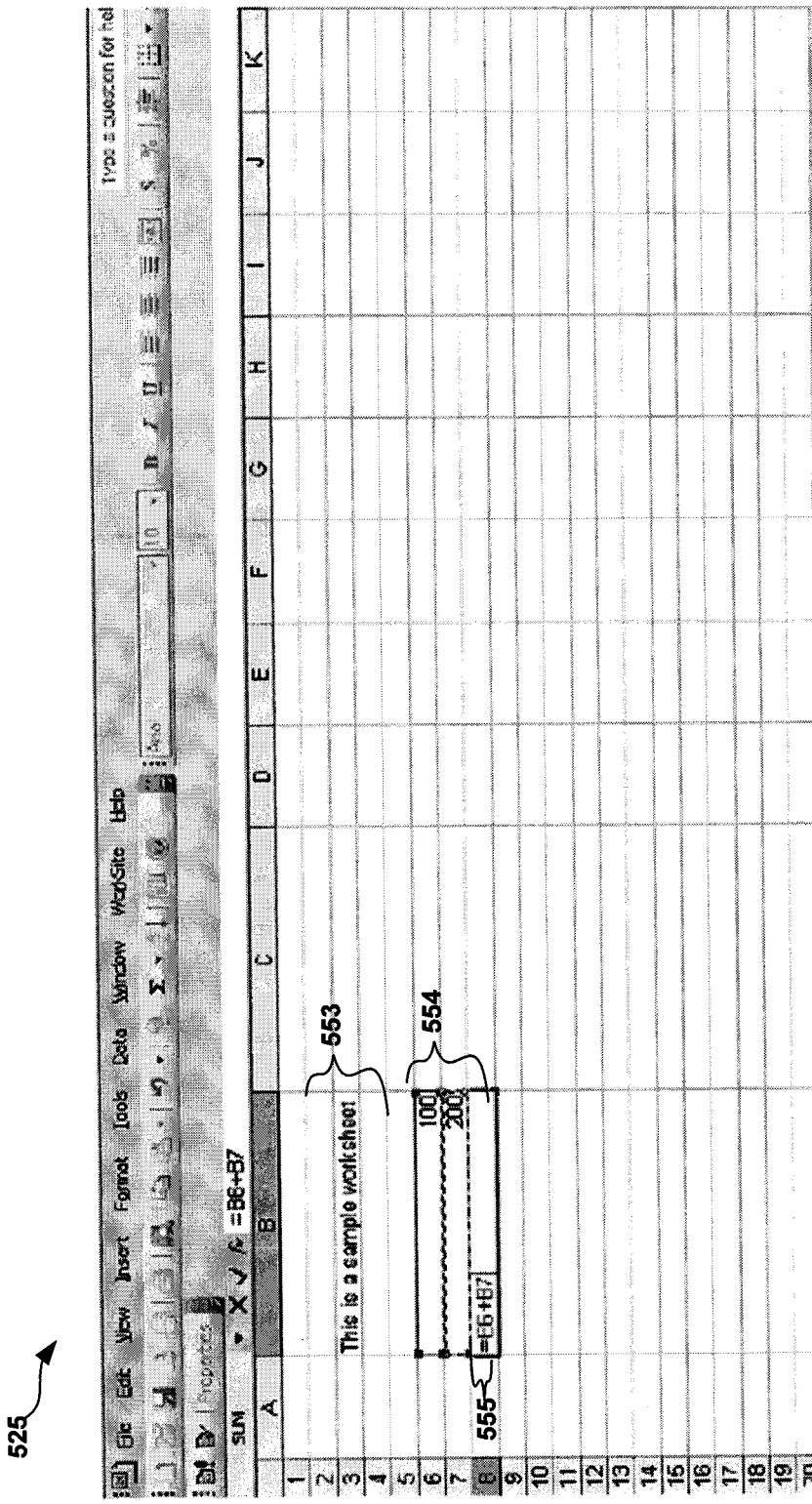
FIG. 5B depicts a sample document having document elements according to one or more embodiments described herein.

For instance, FIG. 5B illustrates an example of what the document 525 may look like. The document 525 may be a spreadsheet document. The document 525 may include document element 553 defined as cell B3, the document element 554 defined as cells B6 through B8, and the document element 555 defined as cell B8. As shown here, the document elements may overlap and may be any defined portion of the document. Moreover, the document elements 553, 554 and 555, when combined, do not need to constitute the entire document. In other words, each of the document elements 553, 554 and 555 may be user-defined to be any portion of the document independent of the other document elements. The document element 553, in this example, is linked to "3010-Index section 11" and "3080-Index section 12" as shown in FIG. 5. The document elements 554 and 555 are not linked to the index 500.

Figure 5C:
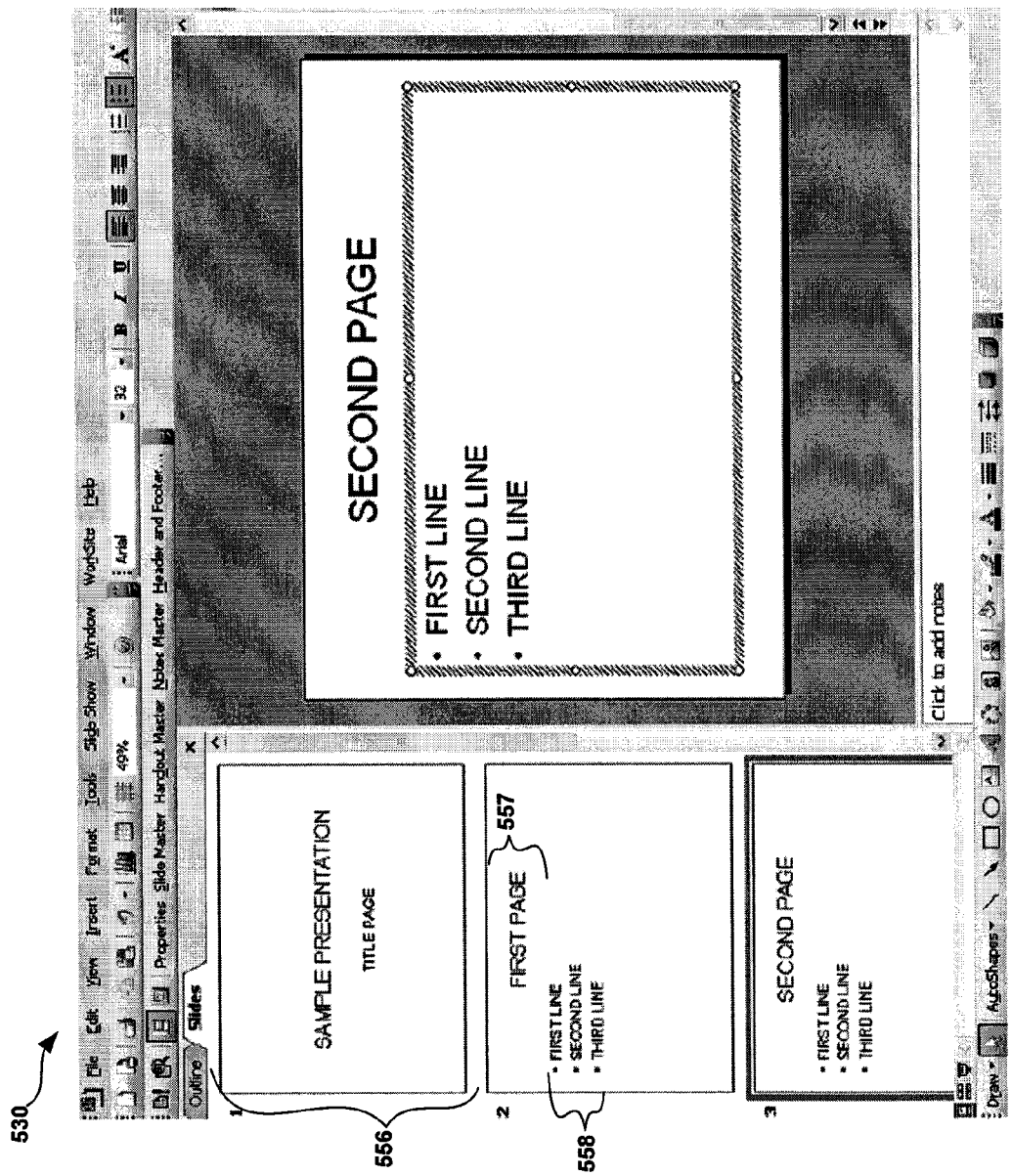
FIG. 5C depicts a sample document having document elements according to one or more embodiments described herein.

FIG. 5C illustrates an example of what the document 530 may look like. The document 530 may be a presentation document. The document 530 may include the document element 556 defined as slide 1, the document element 557 defined as the title of slide 2, and the document element 558 defined as the first 2 bullet points of slide 2. While not shown here, the document elements may overlap and may be any defined portion of the document. Moreover, the document elements 556, 557 and 558, when combined, do not need to constitute the entire document. In other words, each of the document elements 556, 557 and 558 may be user-defined to be any portion of the document independent of the other document elements. The document element 556, in this example, is linked to "1200-Index section 3", as shown in FIG. 5. The document elements 557 and 558 are not linked to the index 500.

Figure 5D:
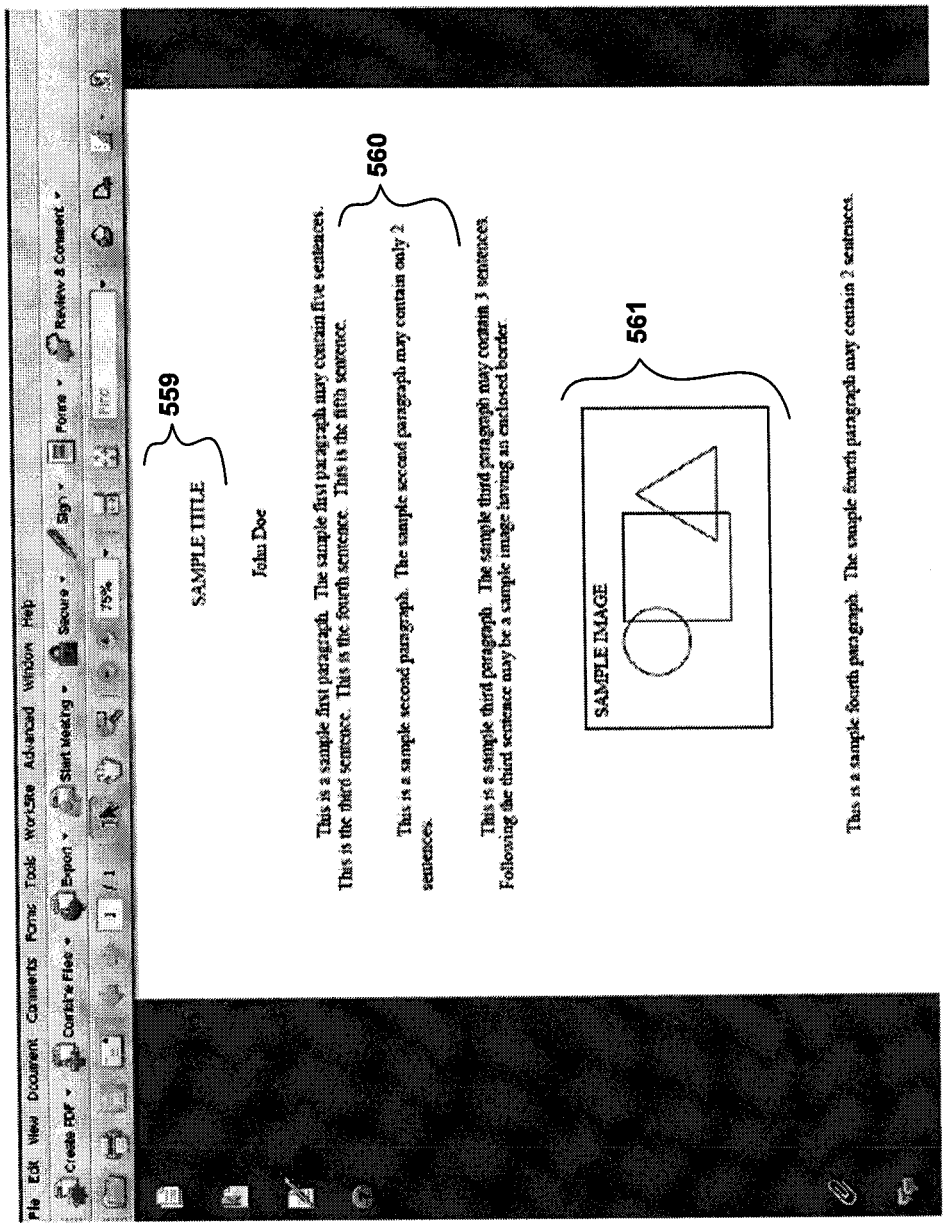
FIG. 5D depicts a sample document having document elements according to one or more embodiments described herein.

FIG. 5D illustrates an example of what the document 535 may look like and may be an image file having both text and images. The document 535 may appear similar to the document 520 in substance and may be the text document 520 (e.g., a file with a .doc extension, .txt extension, and the like) converted into an image file (e.g., a file with a .pdf, .bmp extension, and the like). Here, the document 535 may be broken up into the document element 559 corresponding to an image portion of "SAMPLE TITLE", the document element 560 corresponding to the image portion of the second paragraph, and the document element 561 corresponding to the image titled "SAMPLE IMAGE". The document elements 559 and 560, in this example, are linked to "2500-Index section 9" and "3080-Index section 12" respectively, as shown in FIG. 5. The document element 561 is not linked to the index 500.

In the manner illustrated in FIGS. 5, and 5A through 5D, the index 500 may organize different document elements contained within different file types within a single index. As a result, an indexing system may efficiently organize different files or the constituent parts of different files into an index, thereby allowing a user to easily and efficiently access and organize the desired information.

Referring back to FIG. 5, certain document elements (e.g., document element 550, 552, 553, 556, 559 and 560) may be linked to certain index sections, index subsections and further breakdowns of indexed subsections. The linking of the document element to certain index sections, index subsections and further breakdowns of indexed subsections, may be performed by the user, for example, by highlighting or selecting the document element and dragging and dropping the element into the particular index sections, index subsections and further breakdowns of indexed subsections desired. For instance, the user may be able to highlight or select the document element 550 and drag and drop the document element 550 into the subsection labeled "1050-Index section 2". Upon performing this step, the document element 550 is linked to the index subsection "1050-Index section 2". That is, if the user queries the document element 550 in the index, the "1050-Index section 2" may be displayed with the document element 550. Alternatively and in addition, if the user queries "1050-Index section 2", for example, by clicking on the plus sign corresponding to "1050-Index section 2" or by clicking on the "1050-Index section 2" itself, the document element 550 may appear as a linked element. On the back end, invisible to the user during this process, when the document element is linked to a index section, index subsection, or further breakdown, a pointer may be established which points to a location of the document element and stored at the server 130 and/or the database store 150 to enable the end user device 105 to display the document elements when requested to do so.

The term "document" as used herein may be defined broadly to include any file either textual or not. In fact, the term "document", in addition to the examples cited herein, may be non-traditional document file types such as videos files (having a plurality of video clips, freeze frames, and the like), audio files (having a plurality of audio clips) and so forth. Regardless of the document type, the user may be able to define and/or select portions of the documents and label the defined portion accordingly.

In one embodiment, the user may access the original source files corresponding to the various documents to view, delete, and or edit the documents by using the indexing system 100.

Figure 6:
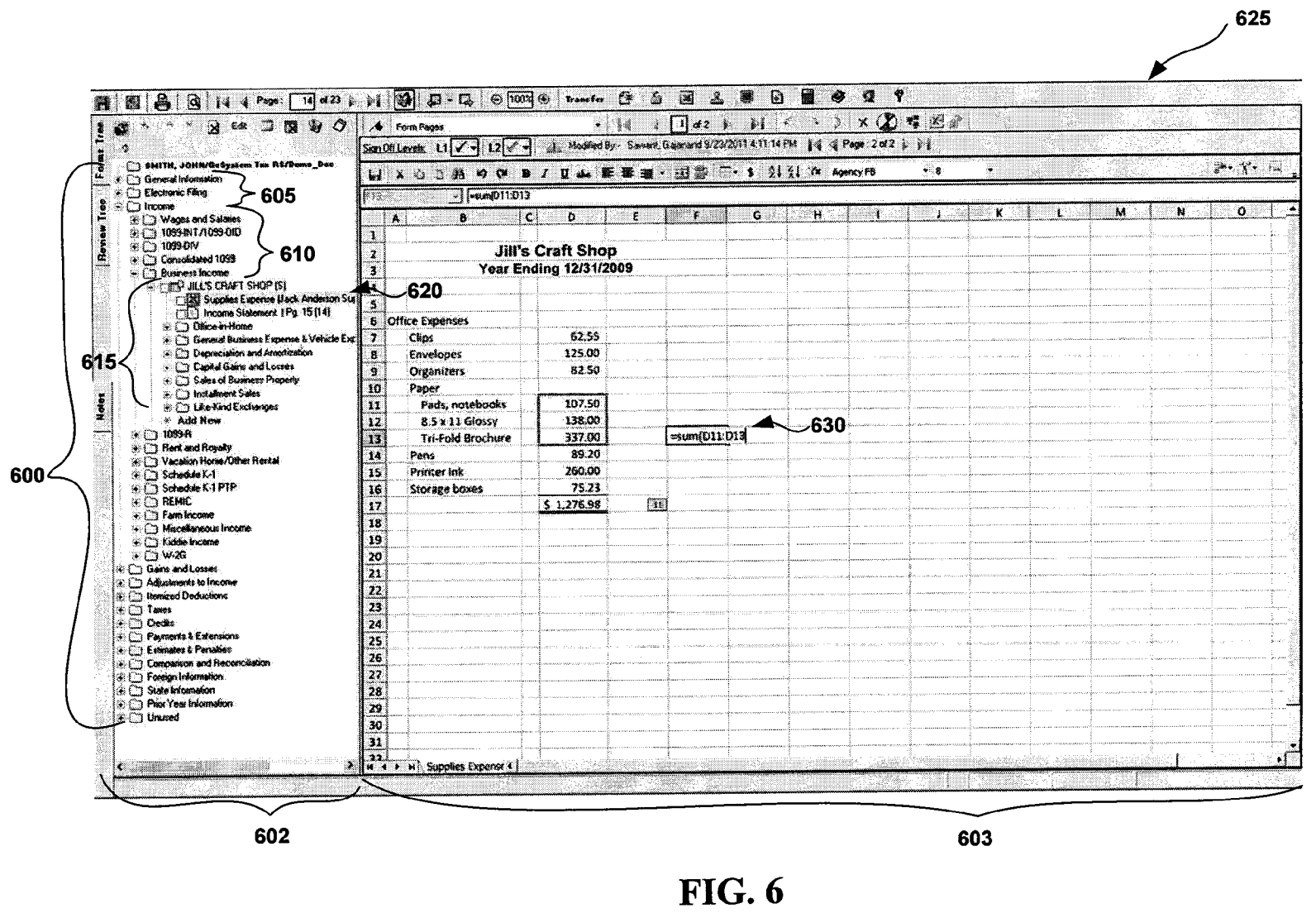

For example, FIG. 6 illustrates an indexing system 600 having index sections 605, index subsections 610, and further breakdowns of the index subsections 615. Here, an index 602 is shown to be a first portion of the displayed indexing system 600, while a document element 603 is shown to be a second portion of the displayed indexing system 600. The document element 603 may correspond to a highlighted element 620 in the index 602. The document element 603 may be one spreadsheet page 625 from a spreadsheet workbook. As shown, document element 603 may be a "Supplies Expense" page detailing office expenses information regarding various items. In one embodiment, when the user is accessing the document element 603 by selecting element 620 inside the indexing system 600, the user may edit the document element 603. For instance, the user may create a sub-total 630 of the various paper costs (e.g., including pads, notebooks, 8.5×11 Glossy and Tri-Fold Brochure). While not shown, the user may create a subsequent document element corresponding to the newly-created sub-total and link the subsequent document element to the same or different index section, index subsection or further breakdown of the index subsection. In one embodiment, the source file from where document element 603 is based on may be changed and saved such that independent access of the source file outside of the index system 600 may still reflect the change.

Basic functionality of the indexing system having been described, attention will now be turned to further describing additional features of the indexing system.

Figure 3E:
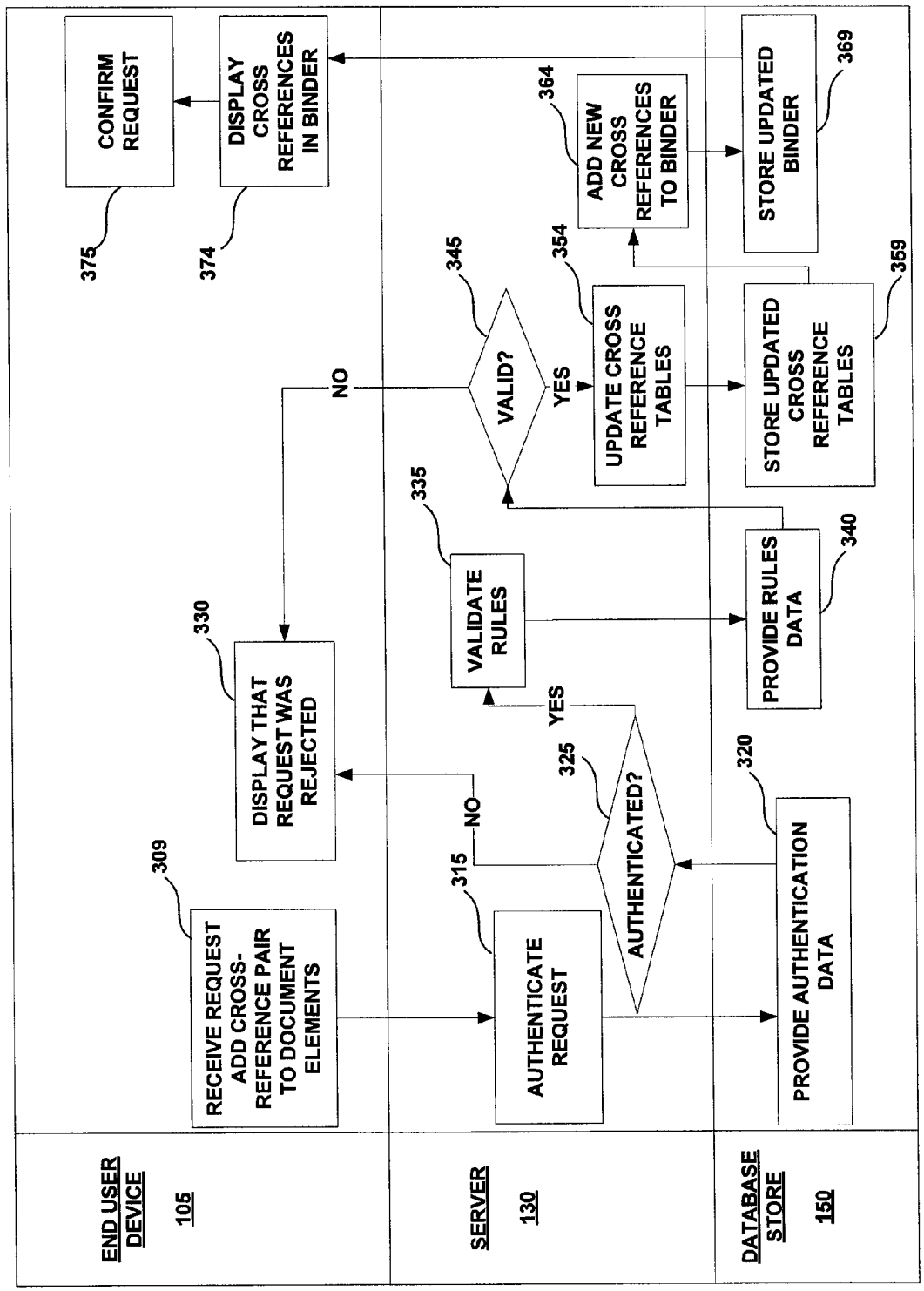
FIG. 3E illustrates a flow chart of cross-referencing according to one or more embodiments described herein.
Figure 12A:
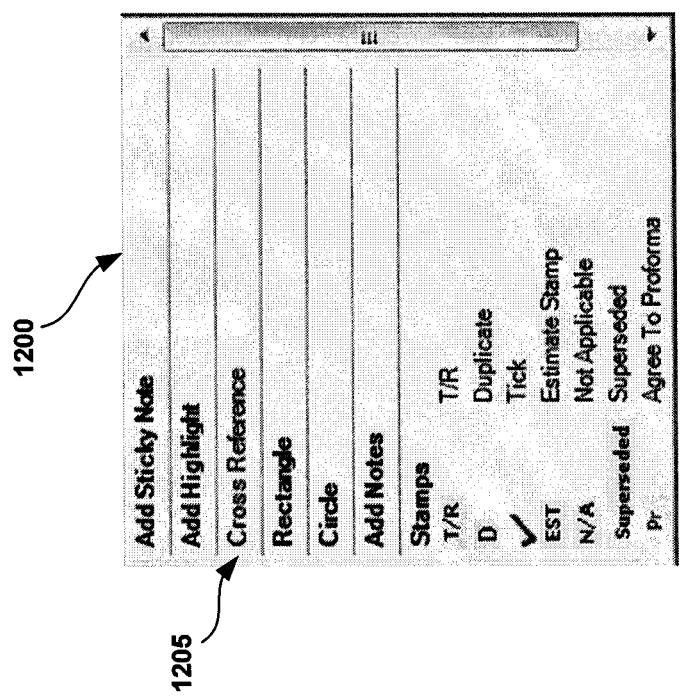
FIG. 12A depicts a menu for establishing a cross-reference according to one or more embodiments described herein.
Figure 12B:
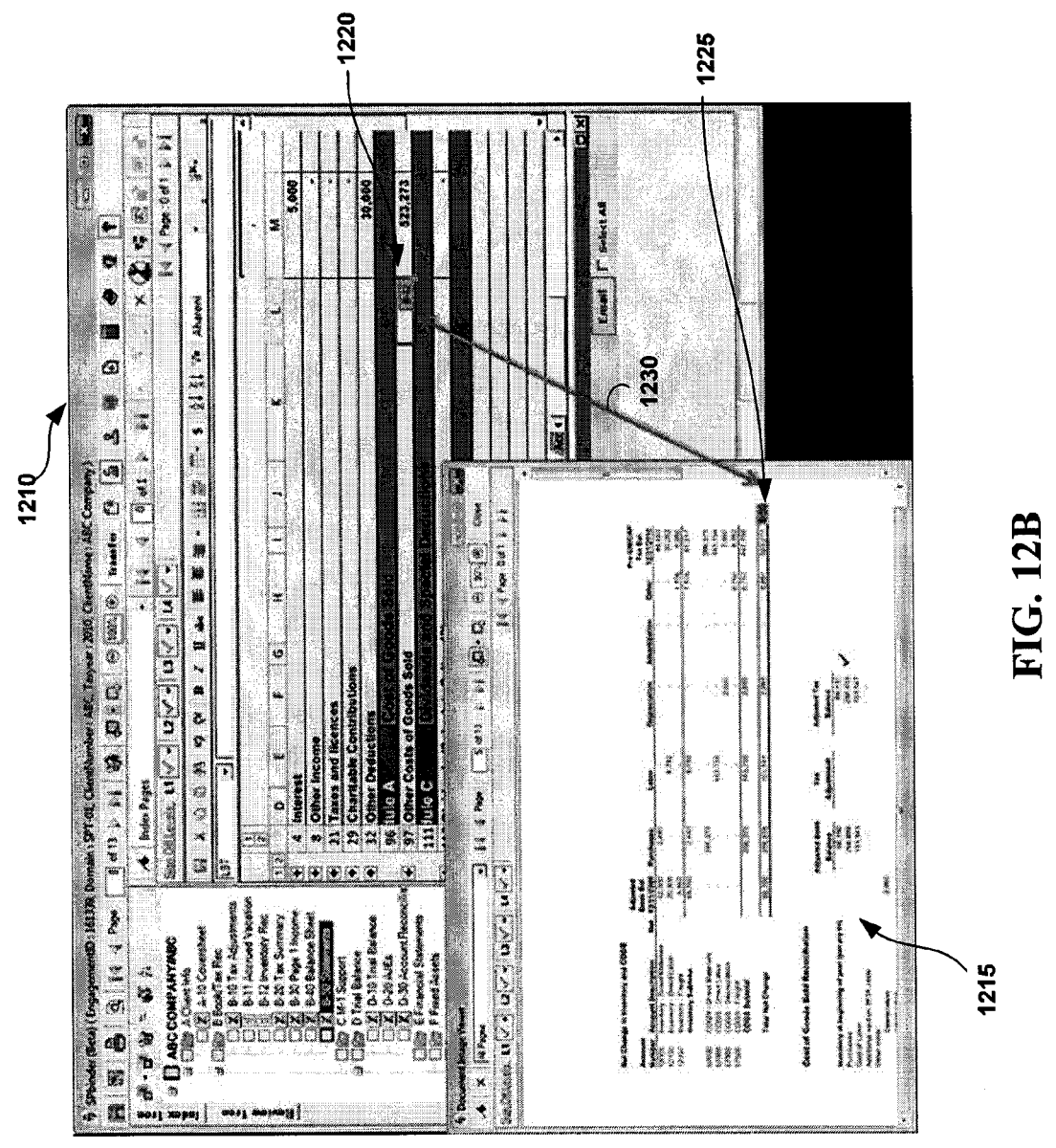

FIG. 3E illustrates one method of adding a cross-reference pair to a document element. As shown, at step 309, the end user device 105 receives a user request to add a cross-reference pair to a document element and submits the request to the server 130. For the sake of brevity, steps 315, 320, 325, 330, 335, 340 and 345 are substantially similar to those discussed above with respect to FIG. 3A and will not be described again. At step 354, after the request is authenticated and validated against defined business rules, the server 130 updates the cross reference tables to include the newly added cross-reference. At step 359, the new updated cross reference tables are stored at the database store 150. At step 364, the cross reference is added to the binder. At step 369, the updated binder is stored at the database store 150. At step 374, the display is updated at the end user device 105 to show the newly added cross reference. At step 375, the request may be optionally confirmed. FIG. 12A illustrates a menu 1200 having a cross reference item 1205. The user may access the menu 1200, for example, by right clicking on a document element or using a tool bar element after selecting the document element. Once the menu 1200 is accessible, the user may select the cross reference item 1205, thereby creating the first of the cross reference pair. The user may then repeat this process on a second document element to establish the cross reference between the first document element and the second document element. FIG. 12B illustrates an example of a screen shot of a cross reference pair 1210 and 1215. As shown, each document element 1210 and 1215 may now include a page or index number 1220 and 1225 corresponding to the other document element. For instance, document element 1210 may include index number 1220, which when selected (e.g., by clicking) by the user may cause document element 1215 to be displayed. In this manner, the cross-reference may operate similarly to a "hyperlink". Reference arrow 1230 indicates the cross reference relationship between index number 1220 and 1225.

Figure 3F:
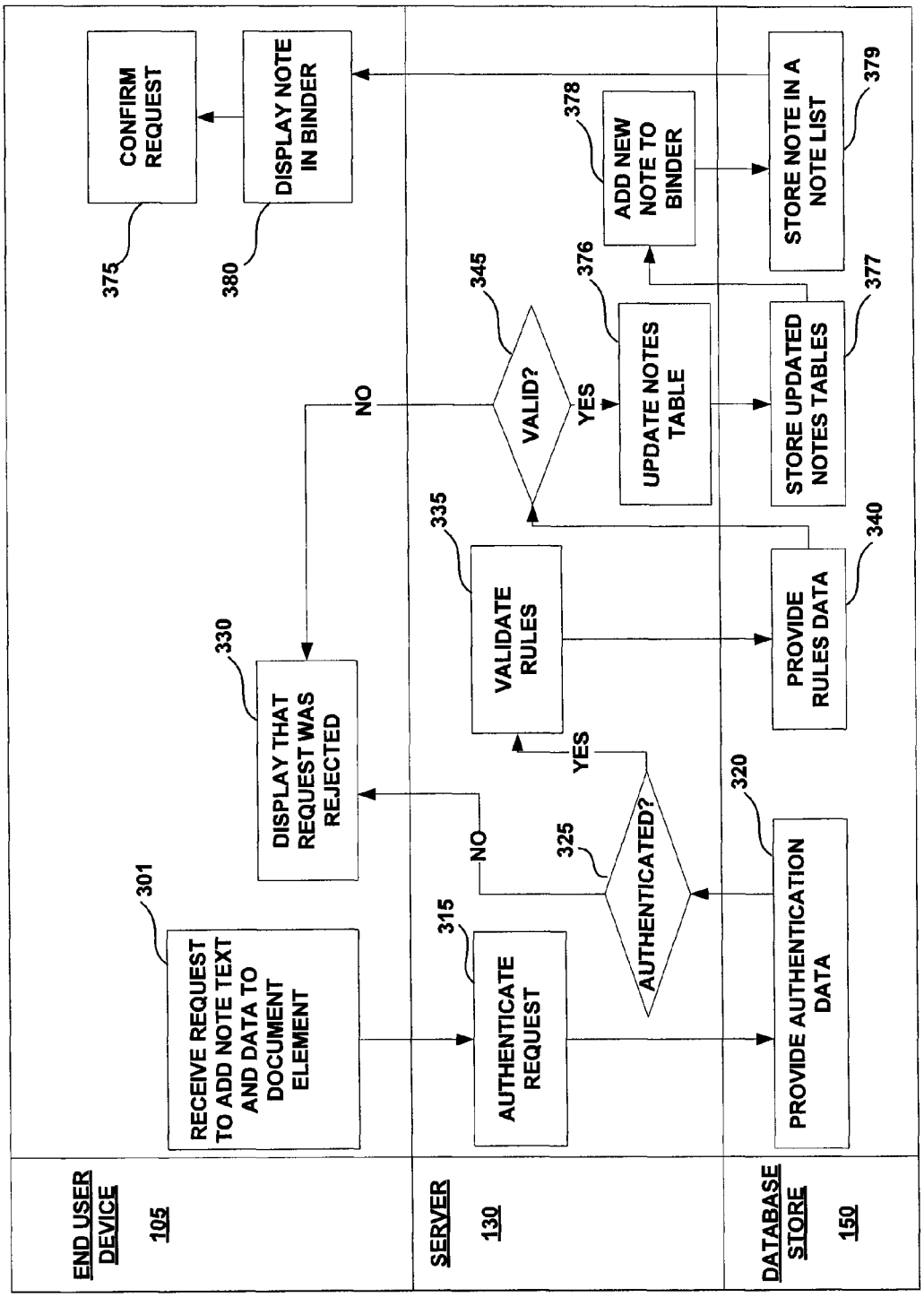
FIG. 3F illustrates a flow chart of adding a note to a document element according to one or more embodiments described herein.
Figure 10:
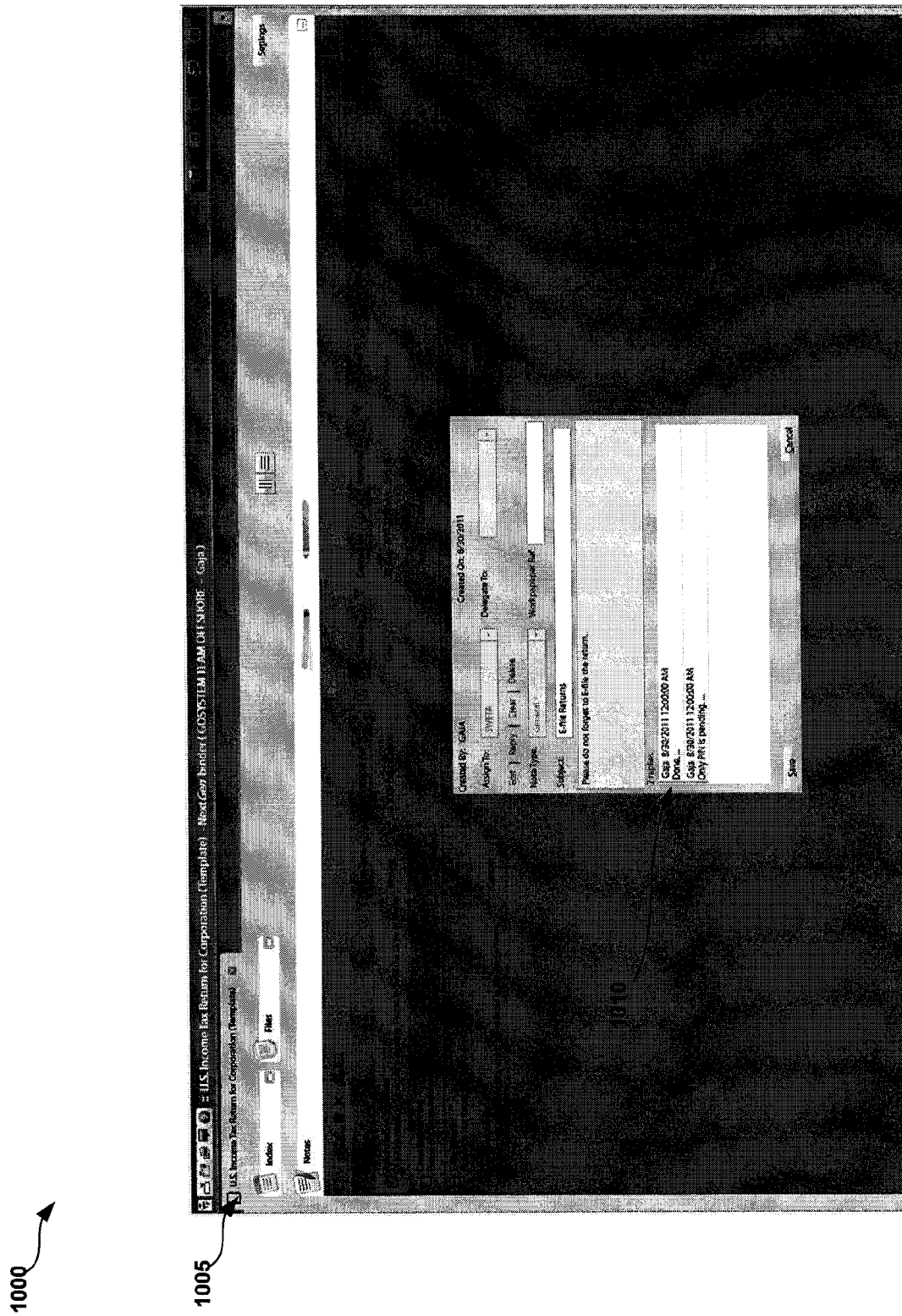
FIG. 10 depicts a snapshot of an interface providing the user an opportunity to add a note according to one or more embodiments described herein.

FIG. 3F illustrates one method of adding a note to a document element. As shown, at step 301, the end user device 105 receives a user request to add a note to a document element and submits the request to the server 130. For the sake of brevity, steps 315, 320, 325, 330, 335, 340 and 345 are substantially similar to those discussed above with respect to FIG. 3A and will not be described again. At step 376, after the request is authenticated and validated against defined business rules, the server 130 updates the notes tables to include the newly added note. At step 377, the updated notes tables are stored at the database store 150. At step 378, the new note is added to the binder. At step 379, the updated binder is stored at the database store 150. At step 380, the display is updated at the end user device 105 to show the newly added note. At step 375, the request may be optionally confirmed. FIG. 10 illustrates a screenshot 1000 of one embodiment of an interface that may be used to add or edit note. The main features 1005 of the binder such as the index, file and notes may appear near the top of the interface. The screenshot 1000 corresponds to when the notes feature is selected or active. Here, when the user clicks on a button selecting a current note, a pop-up box 1010 may appear which allows the user to edit currently inputted notes, review notes applied by others and further edit or fill out relevant fields as illustrated.

Figure 3G:
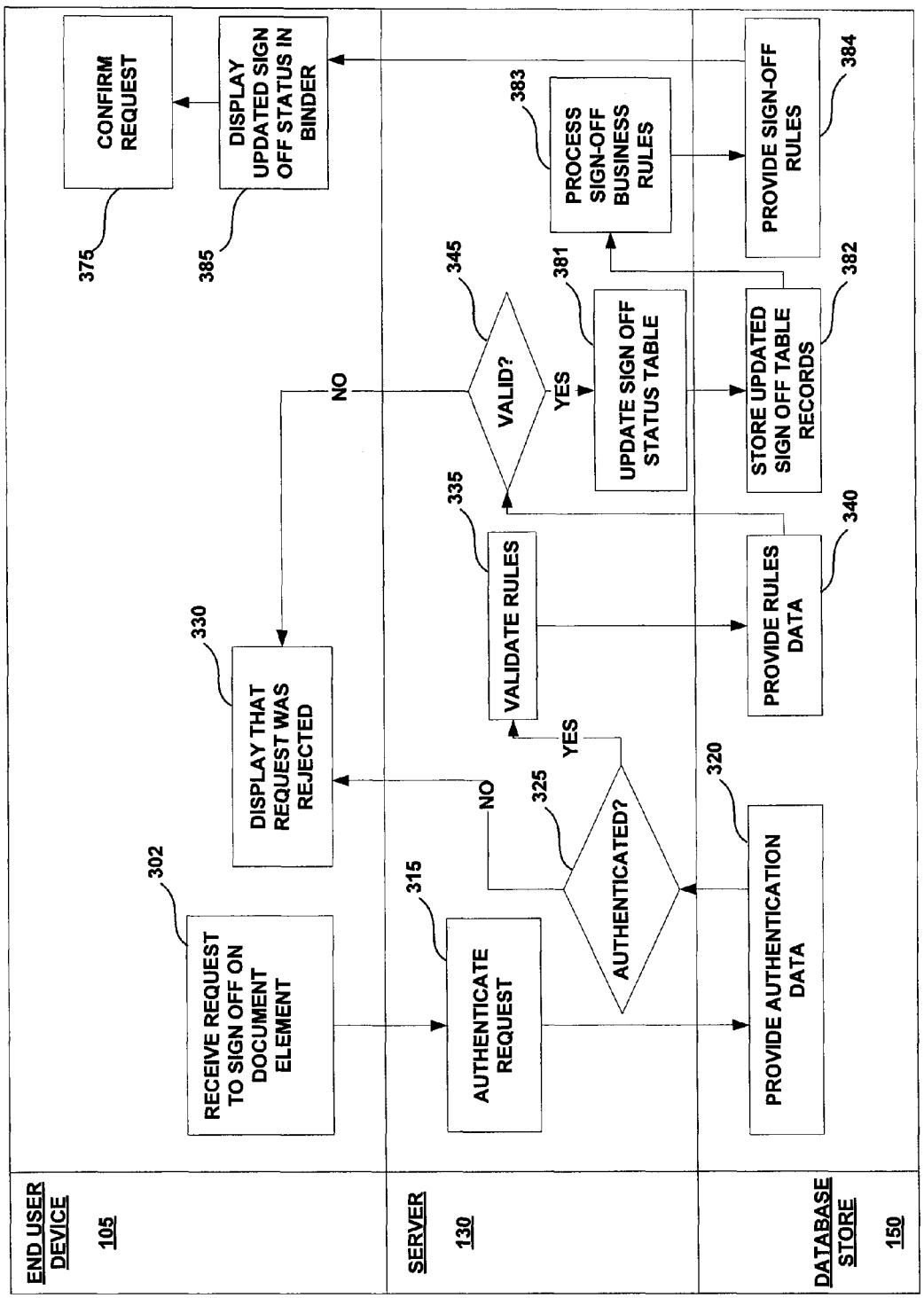
FIG. 3G illustrates a flow chart of one method of signing off on a document element according to one or more embodiments described herein.
Figure 11:
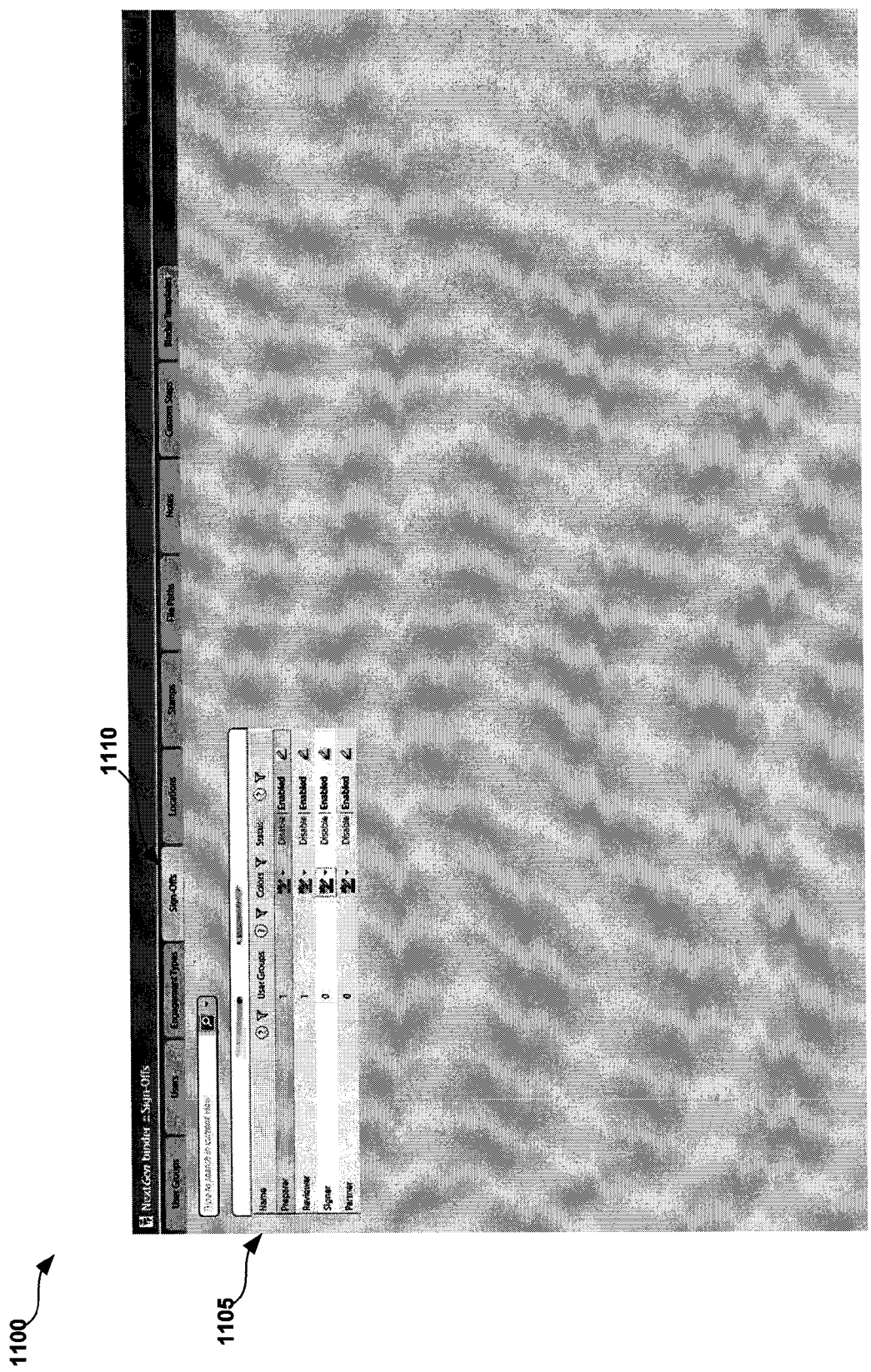
FIG. 11 depicts a snapshot of an interface providing the user an opportunity to set up sign-offs on a document element according to one or more embodiments described herein.
Figure 13B:
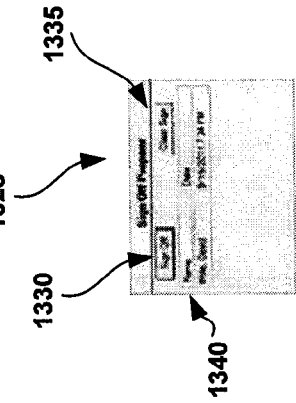
FIG. 13B depicts a snapshot of a sign-off dialog box according to one or more embodiments described herein.
Figure 13A:
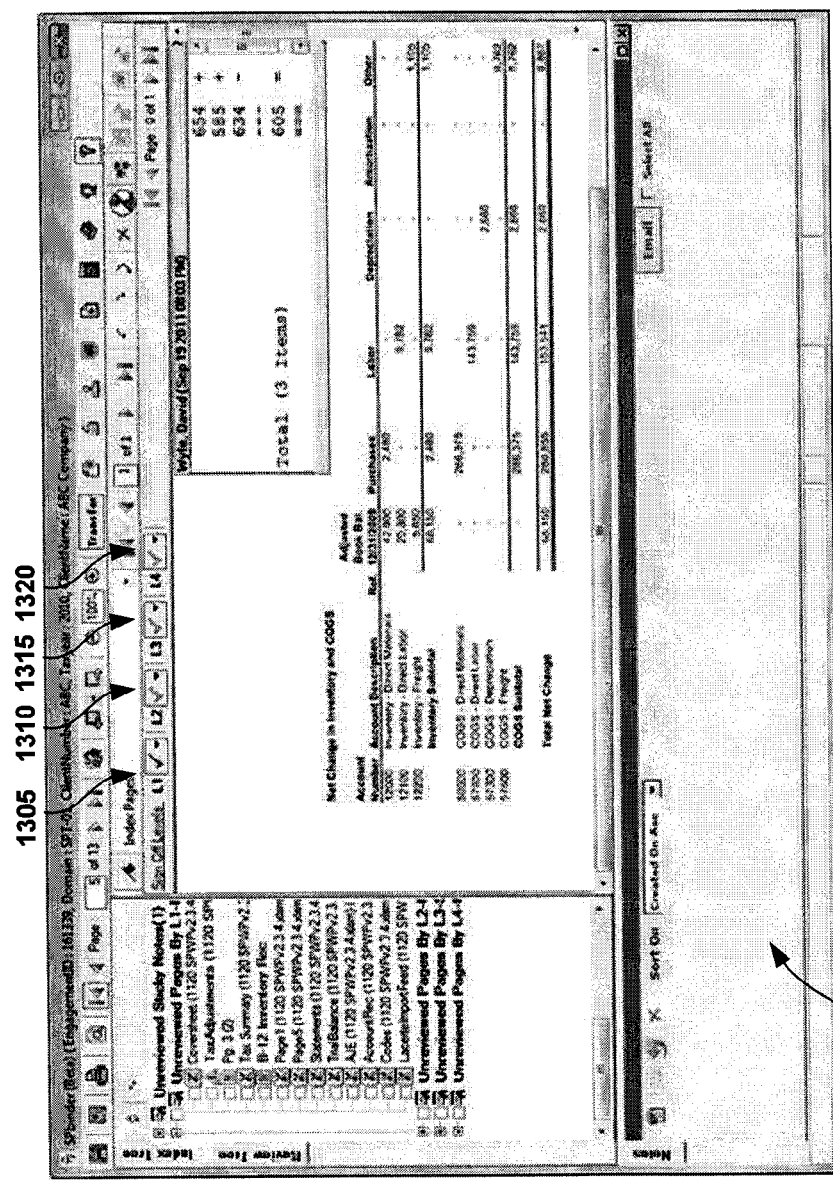
FIG. 13A depicts a snapshot of an interface providing the user an opportunity to sign off on a document according to one or more embodiments described herein.

FIG. 3G illustrates one method of signing off on a document element. As shown, at step 302, the end user device 105 receives a user request to sign off on a document element and submits the request to the server 130. For the sake of brevity, steps 315, 320, 325, 330, 335, 340 and 345 are substantially similar to those discussed above with respect to FIG. 3A and will not be described again. At step 381, after the request is authenticated and validated against defined business rules, the server 130 updates the sign off status tables to include the new sign off. At step 382, the updated sign off tables are stored at the database store 150. At step 383, sign off is processed based on stored business rules and added to the binder. For example, here at this step, the rules may be requested from the rules database store 150. At step 384, the appropriate sign-off rules may be provided to the server 130 to complete processing of the sign-off based on business rules. At step 385, the display is updated at the end user device 105 to show the updated sign-off. At step 375, the request may be optionally confirmed. FIG. 11 illustrates a screenshot 1100 of one embodiment of an administrative interface that may allow the user to set up different sign off levels. For example, the user may enable or disable different sign off levels (e.g., Preparer, Reviewer, etc.) as shown in list 1105 under a sign-offs tab 1110. The user can also authorize various user groups to sign off at those levels. That is, a user in the Preparer user group may be authorized to sign off as a Preparer or Reviewer but not as a Signer or Partner. The ability to select the sign-off color (e.g., red, blue, black, etc.) for each sign off level is also provided in this screen. FIG. 13A illustrates a screenshot 1300 of a document element having four sign-off buttons 1305, 1310, 1315 and 1320 (corresponding to four sign-off levels, with each sign-off level having an unlimited number of users qualified for that sign-off level to each sign-off on the document element). In one embodiment, to perform the sign-off, a user may click on the sign off button (e.g., 1305) which may pull up a sign-off dialog box 1325 (as shown in FIG. 13B). The user may then select the sign-off button 1330 of the sign-off dialog box 1325. Alternatively, the user may clear the sign-off (e.g., to undo a sign-off) by selecting the clear button 1335. The sign-off dialog box 1325 may further include information regarding the signer and the time/date of the signing in box 1340.

In the above manner, an index organizing different document elements and document element components may be provided.

Those of ordinary skill will also understand that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in tangible, non-transitory memory such as RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An indexing system for an electronic binder configured to organize elements or components of heterogeneous documents, the indexing system comprising:
   an end user device having a first processor and a first non-transitory memory configured to store device instructions that cause the first processor:
      to receive user instruction to create a binder, the binder having a binder index including a first section and a second section,
      to receive user instruction to link a first document element to the first section of the binder index, the first document element comprising a portion of a first document, and
      further to receive user instruction to link a second document element to the second section of the binder index, the second document element comprising a portion of a second document;
   a server coupled to the end user device, the server having a second processor and a second non-transitory memory configured to store server instructions that cause the second processor:
      to receive a request from the end user device to create the binder,
      to create binder records corresponding to the binder,
      to receive a request from the end user device to link the first document element with the first section of the binder index,
      to create a first pointer corresponding to a source location of the first document element and link the first pointer to the first section of the binder index,
      to receive a request from the end user device to link the second document element with the second section of the binder index, and
      to create a second pointer corresponding to a source location of the second document element and link the second pointer to the second section of the binder index; and
   a database store coupled to the server, the database store having a third processor and a third non-transitory memory configured to store database instructions that cause the third processor:
      to receive and store the binder records created by the server,
      to receive and store the first pointer and information related to linking the first pointer to the first section of the binder index, and
      to receive and store the second pointer and information related to linking the second pointer to the second section of the binder index.

2. The indexing system of claim 1, wherein the first document has a file type different from the second document.

3. The indexing system of claim 1, wherein the first document element is a section of a text or image file, and the second document element is a section of a spreadsheet file.

4. The indexing system of claim 1, wherein the first document element and the second document element both relate to the fields of tax preparation, accounting or auditing.

5. The indexing system of claim 1, wherein the end user device is further configured to receive user instruction to create a new index section in the binder index, wherein the server is configured to create a record corresponding to the new index section and to record the new index section to the binder index, and wherein the database store is configured to store the record corresponding to the new index section and to store the binder index including the new index section.

6. The indexing system of claim 1, wherein the end user device is further configured to receive user instruction to add a new document to the binder, wherein the server is configured to create a new document record corresponding to the new document and to add the new document to the binder, and wherein the database store is configured to store the new document record corresponding to the new document and to store the binder including the new document.

7. The indexing system of claim 6, wherein the end user device is further configured to receive user instruction to create a new document element from the new document, wherein the server is configured to create a pointer to the new document element from the new document, and wherein the database store is configured to store the pointer to the new document element from the new document.

8. The indexing system of claim 7, wherein the end user device is further configured to receive user instruction to create a cross-reference between the new document element and the first document element, wherein the server is configured to update a cross-reference table to include the cross-reference between the new document element and the first document element, and wherein the database store is configured to store the updated cross-reference table.

9. The indexing system of claim 7, wherein the end user device is further configured to receive user instruction to create, edit or delete a note corresponding to the new document element, wherein the server is configured perform the creating, editing or deleting of the note corresponding to the new document element by updating a notes table, and wherein the database store is configured to store the updated notes table.

10. The indexing system of claim 7, wherein the end user device is further configured to receive user instruction to sign off on the new document element, wherein the server is configured sign off on the new document element by updating a sign-off table, and wherein the database store is configured to store the updated sign-off table.

11. An indexing system for an electronic binder configured to organize elements or components of heterogeneous documents, the indexing system comprising:
a first processor;
a first non-transitory memory device coupled to the first processor, and configured to store instructions that when executed by the first processor, causes the first processor to perform:
receiving user instruction to create a binder, the binder having a binder index including a first section and a second section,
receiving user instruction to link a first document element to the first section of the binder index, the first document element comprising a portion of a first document, and
receiving user instruction to link a second document element to the second section of the binder index, the second document element comprising a portion of a second document;
a second processor;
a second non-transitory memory device coupled to the second processor, and configured to store instructions that when executed by the second processor, causes the second processor to perform:
receiving a request from the first processor to create the binder,
creating binder records corresponding to the binder,
receiving a request from the first processor to link the first document element to the first section of the binder index,
creating a first pointer corresponding to a source location of the first document element,
linking the first pointer to the first section of the binder index,
receiving a request from the first processor to link the second document element to the second section of the binder index,
creating a second pointer corresponding to a source location of the second document element, and
linking the second pointer to the second section of the binder index.

12. The indexing system of claim 11, wherein the first non-transitory memory device is further configured to store instructions that when executed by the first processor, causes the first processor to receive an instruction from the user to create a new index section in the binder index and to send a request to create the new index section in the binder index, wherein the second non-transitory memory device is further configured to store instructions that when executed by the second processor, causes the second processor to receive the request to create the new index section in the binder index from the first processor and create a record corresponding to the new index section.

13. The indexing system of claim 11, wherein the first non-transitory memory device is further configured to store instructions that when executed by the first processor, causes the first processor to receive an instruction from the user to add a new document to the binder and to send a request to add the new document to the binder, wherein the second non-transitory memory device is further configured to store instructions that when executed by the second processor, causes the second processor to receive the request to add the new document to the binder from the first processor, to create a record corresponding to the new document, and to add the new document to the binder.

14. The indexing system of claim 13, wherein the first non-transitory memory device is further configured to store instructions that when executed by the first processor, causes the first processor to receive an instruction from the user to create a new document element from the new document and to send a request to create the new document element from the new document, wherein the second non-transitory memory device is further configured to store instructions that when executed by the second processor, causes the second processor to receive the request to create the new document element from the new document from the first processor and to create a pointer to the new document element from the new document.

15. The indexing system of claim 14, wherein the first non-transitory memory device is further configured to store instructions that when executed by the first processor, causes the first processor to receive an instruction from the user to create a cross-reference between the new document element and the first document element and to send a request to create the cross-reference between the new document element and the first document element, wherein the second non-transitory memory device is further configured to store instructions that when executed by the second processor, causes the second processor to receive the request to create the cross-reference between the new document element and the first document element from the first processor and to update a cross-reference table to include the cross-reference between the new document element and the first document element.

16. The indexing system of claim 14, wherein the first non-transitory memory device is further configured to store instructions that when executed by the first processor, causes the first processor to receive an instruction from the user to create, edit or delete a note corresponding to the new document element and to send a request to create, edit or delete the note corresponding to the new document element, wherein the second non-transitory memory device is further configured to store instructions that when executed by the second processor, causes the second processor to receive the request to create, edit or delete the note corresponding to the new document element from the first processor and to update a notes table corresponding to the requested creation, editing or deletion of the note corresponding to the new document element.

17. The indexing system of claim 14, wherein the first non-transitory memory device is further configured to store instructions that when executed by the first processor, causes the first processor to receive an instruction from the user to receive user instruction to sign off on the new document element and to send a request to receive the user instruction to sign off on the new document element, wherein the second non-transitory memory device is further configured to store instructions that when executed by the second processor, causes the second processor to receive the request to receive the user instruction to sign off on the new document element from the first processor and to update a sign-off table to sign off on the new document element.

18. The indexing system of claim 11, further comprising:
a third processor; and
a third non-transitory memory device coupled to the third processor, and configured to store instructions that when executed by the third processor, causes the third processor to perform:
receiving and storing the binder records created by the second processor,
receiving and storing the first pointer and information related to linking the first pointer to the first section of the binder index, and
receiving and storing the second pointer and information related to linking the second pointer to the second section of the binder index.

19. A method of indexing an electronic binder configured to organize elements or components of heterogeneous documents, the method comprising:
receiving, at a end user device, user instruction to create a binder, the binder having a binder index including a first section and a second section;
receiving, at the end user device, user instruction to link a first document element to the first section of the binder index, the first document element comprising a portion of a first document;
receiving, at the end user device, user instruction to link a second document element to the second section of the binder index, the second document element comprising a portion of a second document;
receiving, at a server, a request from the end user device to create the binder;
creating, at the server, binder records corresponding to the binder;
receiving, at the server, a request from the end user device to link the first document element to the first section of the binder index;
creating, at the server, a first pointer corresponding to a source location of the first document element;
linking, at the server, the first pointer to the first section of the binder index;
receiving, at the server, a request from the end user device to link the second document element to the second section of the binder index;
creating, at the server, a second pointer corresponding to a source location of the second document element; and
linking, at the server, the second pointer to the second section of the binder index.

20. The method of claim 19, further comprising:
receiving and recording, at a database store, the binder records created by the server;
receiving and recording, at the database store, the first pointer and information related to linking the first pointer to the first section of the binder index; and
receiving and recording, at the database store, the second pointer and information related to linking the second pointer to the second section of the binder index.

* * * * *